(12) United States Patent
Aleem et al.

(10) Patent No.: US 12,142,003 B2
(45) Date of Patent: Nov. 12, 2024

(54) IMAGE BASED DETECTION OF DISPLAY FIT AND OPHTHALMIC FIT MEASUREMENTS

(71) Applicant: Google LLC, Mountain View, CA (US)

(72) Inventors: Idris Syed Aleem, Kitchener (CA); Rees Anwyl Samuel Simmons, Waterloo (CA); Sushant Umesh Kulkarni, Waterloo (CA); Ahmed Gawish, Waterloo (CA); Mayank Bhargava, Kitchener (CA)

(73) Assignee: Google LLC, Mountain View, CA (US)

( * ) Notice: Subject to any disclaimer, the term of this patent is extended or adjusted under 35 U.S.C. 154(b) by 756 days.

(21) Appl. No.: 17/238,861

(22) Filed: Apr. 23, 2021

(65) Prior Publication Data

US 2022/0343534 A1    Oct. 27, 2022

(51) Int. Cl.
*G06T 7/73* (2017.01)
*G06K 19/06* (2006.01)
*G06V 40/16* (2022.01)

(52) U.S. Cl.
CPC .......... *G06T 7/74* (2017.01); *G06K 19/06037* (2013.01); *G06V 40/165* (2022.01); *G06T 2207/30201* (2013.01); *G06T 2207/30204* (2013.01)

(58) Field of Classification Search
CPC ............. G06T 7/74; G06T 2207/30201; G06T 2207/30204; G06V 40/165; G06K 19/06037
See application file for complete search history.

(56) References Cited

U.S. PATENT DOCUMENTS

| | | | |
|---|---|---|---|
| 11,277,597 B1* | 3/2022 | Canberk | G06V 20/20 |
| 2013/0114850 A1* | 5/2013 | Publicover | A61B 3/0025 |
| | | | 382/103 |
| 2015/0055086 A1* | 2/2015 | Fonte | G06F 16/22 |
| | | | 700/98 |
| 2018/0032135 A1 | 2/2018 | Rijnders | |
| 2020/0209652 A1 | 7/2020 | El-Hajal et al. | |
| 2020/0285081 A1 | 9/2020 | Fonte et al. | |
| 2021/0375048 A1* | 12/2021 | Kang | G02B 27/0176 |
| 2024/0012450 A1* | 1/2024 | Berliner | G02B 27/0172 |

* cited by examiner

*Primary Examiner* — Pinalben Patel
(74) *Attorney, Agent, or Firm* — Brake Hughes Bellermann LLP

(57) ABSTRACT

A system and method of detecting display fit measurements and/or ophthalmic measurements for a head mounted wearable computing device including a display device is provided. An image of a fitting frame worn by a user of the computing device is captured by the user, through an application running on the computing device. One or more visual markers each including a distinct pattern are detected in the image including the fitting frame. A model of the fitting frame, and configuration information associated with the fitting frame, are determined based on the detection of the pattern. A three-dimensional pose of the fitting frame is determined based on the detected visual marker(s) and patterns, and the configuration information associated with the fitting frame. The display device of the head mounted wearable computing device can then be configured based on the three-dimensional pose of the fitting frame as captured in the image.

19 Claims, 19 Drawing Sheets

IMAGE BASED DETECTION OF DISPLAY FIT AND OPHTHALMIC FIT MEASUREMENTS

TECHNICAL FIELD

This description relates in general to the prediction of display fit and ophthalmic fit of a wearable device, and in particular to the prediction of display fit and ophthalmic fit of a head worn computing device including display capability.

BACKGROUND

Wearable devices may include head worn devices including, for example, smart glasses, headsets, ear buds and the like, wrist and/or hand worn devices such as smart watches, smart bracelets, smart rings and the like, smart pendants, fitness trackers, cameras, body sensors, and other such devices. In some examples, a user may want to customize a wearable device for fit and/or function. For example, a user may wish to customize a pair of smart glasses to include selection of frames, incorporation of prescription lenses, and other such features. Existing systems for procurement of these types of wearable devices do not provide for this type of customization and fitting, particularly without access to a retail establishment.

SUMMARY

In one general aspect, a method of detecting display fit measurements for a head mounted wearable computing device including a display device may include detecting, by an application executing on a computing device, at least one visual marker on a fitting frame from an image captured by the computing device; detecting, by the application executing on the computing device, a pattern included in the at least one visual marker detected in the image; identifying the fitting frame and accessing configuration information associated with the fitting frame based on the detected pattern; determining a three-dimensional pose of the fitting frame based on the detecting of the at least one visual marker, the detecting of the pattern, and the configuration information associated with the identified fitting frame; and determining a configuration of the display device of the head mounted wearable computing device based on the three-dimensional pose of the fitting frame as captured in the image.

In some implementations, detecting the at least one visual marker includes detecting a plurality of visual markers on the fitting frame in the captured image, including detecting a first visual marker including a first pattern on a first rim portion of the fitting frame; detecting a second visual marker including a second pattern on the first rim portion of the fitting frame; and detecting a third visual marker including a third pattern on a second rim portion of the fitting frame. The second visual marker may be different from the first visual marker, and the third visual marker may be different from the first visual marker and different from the second visual marker.

In some implementations, determining the three-dimensional pose of the fitting frame may include performing a first comparison, including comparing a known position and orientation of the first visual marker and the first pattern to a position and an orientation of the first visual marker and the first pattern detected in the image; and determining the three-dimensional pose of the fitting frame relative to the camera based on the first comparison. Determining the three-dimensional pose of the fitting frame may also include performing a second comparison, including comparing a known position and orientation of the second visual marker and the second pattern to a position and an orientation of the second visual marker and the second pattern detected in the image; performing a third comparison, including comparing a known position and orientation of the third visual marker and the third pattern to a position and an orientation of the third visual marker and the third pattern detected in the image; and determining the three dimensional pose of the fitting frame relative to the camera based on the first, second and third comparisons.

In some implementations, identifying the fitting frame and accessing configuration information associated with the fitting frame based on the detected pattern includes identifying at least one of a model of the fitting frame, dimensions of the fitting frame, physical characteristics of the fitting frame, or placement location of the detected at least one visual marker on the fitting frame.

In some implementations, the method may also include detecting a plurality of facial landmarks in the captured image; and determining ophthalmic fit measurements for the head mounted wearable computing device based on the detected plurality of facial landmarks. Detecting the plurality of facial landmarks may include detecting a user pupil height in the image of the fitting frame worn by the user; detecting at least one of an interpupillary distance or a monocular pupil distance in the image of the fitting frame worn by the user; and determining a pantoscopic angle of the fitting frame worn by the user based on the determined three-dimensional pose of the fitting frame and the detected plurality of facial landmarks. Determining the configuration of the display device of the head mounted wearable computing device based on the three-dimensional pose of the fitting frame as captured in the image may include adapting the configuration of the display device of the head mounted wearable computing device to accommodate the ophthalmic fit measurements.

In another general aspect, a non-transitory computer-readable medium may store executable instructions that when executed by at least one processor are configured to cause the at least one processor to capture an image of a fitting frame worn by a user; detect at least one visual marker on the fitting frame from the captured image; detect a pattern included in the at least one visual marker detected in the image; identify the fitting frame and access configuration information associated with the fitting frame based on the detected pattern; determine a three-dimensional pose of the fitting frame based on the detection of the at least one visual marker, the detection of the pattern, and the configuration information associated with the identified fitting frame; and determine a configuration of a display device of a head mounted wearable computing device based on the three-dimensional pose of the fitting frame as captured in the image.

In some implementations, the instructions may cause the at least one processor to detect a plurality of visual markers on the fitting frame in the captured image, including detect a first visual marker including a first pattern on a first rim portion of the fitting frame; detect a second visual marker including a second pattern on the first rim portion of the fitting frame, the second pattern being different from the first pattern; and detect a third visual marker including a third pattern on a second rim portion of the fitting frame, the third pattern being different from the first pattern and the second pattern.

In some implementations, the instructions may cause the at least one processor to determine the three-dimensional pose of the fitting frame including perform a first comparison, including comparing a known position and orientation of the first visual marker and the first pattern to a position and an orientation of the first visual marker and the first pattern detected in the image; and determine the three-dimensional pose of the fitting frame based on the first comparison. In some implementations, the instructions cause the at least one processor to perform a second comparison, including comparing a known position and orientation of the second visual marker and the second pattern to a position and an orientation of the second visual marker and the second pattern detected in the image; perform a third comparison, including comparing a known position and orientation of the third visual marker and the third pattern to a position and an orientation of the third visual marker and the third pattern detected in the image; and determine the three dimensional pose of the fitting frame relative to the camera based on the first, second and third comparisons.

In some implementations, the instructions may cause the at least one processor to identify the fitting frame and access the configuration information associated with the fitting frame based on the detected pattern, including identify at least one of a model of the fitting frame, dimensions of the fitting frame, physical characteristics of the fitting frame, or placement location of the detected at least one visual marker on the fitting frame. In some implementations, the instructions may also cause the at least one processor to detect a plurality of facial landmarks in the captured image; and determine ophthalmic fit measurements for the head mounted wearable computing device based on the detected plurality of facial landmarks, including detect a user pupil height in the image of the fitting frame worn by the user; detect at least one of an interpupillary distance or a monocular pupil distance in the image of the fitting frame worn by the user; and determine a pantoscopic angle of the fitting frame worn by the user in the based on the determined three-dimensional pose of the fitting frame and the detected plurality of facial landmarks. In some implementations, the instructions may cause the at least one processor to adapt the configuration of the display device of the head mounted wearable computing device to accommodate the ophthalmic fit measurements.

In another general aspect, a fitting frame may provide for determination of display fit measurements for a head mounted wearable computing device including a display device. The fitting frame may include a frame, including a first rim, a second rim, a bridge extending between a first portion of the first rim and a first portion of the second rim, a first temple arm coupled to a second portion of the first rim, and a second temple arm portion coupled to a second portion of the second rim. The fitting frame may also include a first visual marker included at the second portion of the first rim, the first visual marker including a first pattern, a second visual marker included at a third portion of the first rim, the second visual marker including a second pattern that is different from the first pattern, and a third visual marker included at the second portion of the second rim, the third visual marker including a third pattern different from the first pattern and the second pattern.

In some implementations, the first pattern, the second pattern and the third pattern may be defined by at least one of a matrix barcode affixed to the frame and configured to be visible to a camera of a computing device, a retroreflective marker configured to be selectively illuminated by an illuminator of a computing device so as to be visible to an image sensor of the computing device when illuminated by the illuminator, or a light source configured to output an illumination pattern so as to be selectively visible to an image sensor of a computing device. In some implementations, the first visual marker and the first pattern, the second visual marker and the second pattern, and the third visual marker and the third pattern may be positioned on the frame and configured so as to discriminate a three-dimensional pose of the frame from an image of the fitting frame worn by a user captured by an external computing device operated by the user.

The details of one or more implementations are set forth in the accompanying drawings and the description below. Other features will be apparent from the description and drawings, and from the claims.

DETAILED DESCRIPTION

This disclosure relates to systems and methods for determining display fit measurements and ophthalmic fit measurements for a wearable computing device. Systems and methods, in accordance with implementations described herein, provide for the collection of display fit measurements and/or ophthalmic fit measurements for a wearable computing device based on measurements of physical attributes of a user detected within an image capture. Systems and methods, in accordance with implementations described herein, provide for the collection of display fit measurements and/or ophthalmic fit measurements based on visual markers provided on a sample frame of the wearable computing device detected within an image capture. In some examples, systems and methods as described herein may provide for the collection of display fit measurements and/or ophthalmic fit measurements from image capture data, for wearable computing devices in the form of smart glasses that include both a display and corrective/prescription lenses that are customized for the particular physical attributes, needs and preferences of a particular user. The collection of display fit measurements and/or ophthalmic fit measurements using an image based data capture system and method may allow a wearable computing device, such as, for example, smart glasses and other such wearable computing devices, to be customized for the specific needs, preferences and functionality associated with a particular user, without the need to access a physical retail establishment.

Hereinafter, systems and methods, in accordance with implementations described herein, will be described with respect to the fitting of a wearable computing device in the form of a head mounted display device, such as, for example, smart glasses including a display device, such that content displayed by the display device is viewable by/visible to a user wearing the wearable computing device. In a situation in which the user would benefit from a wearable computing device including corrective lenses, these systems and methods may provide for the collection of ophthalmic fit measurements, allowing for the incorporation of corrective/prescription lenses into the wearable computing device, and for taking into account the features of the corrective/prescription lenses in the configuration of the display device for the wearable computing device. That is, systems and methods, in accordance with implementations described herein, may collect display fit measurements and/or ophthalmic fit measurements using an image based capture system and method to provide for the fitting of a display device and corrective/prescription lenses such that content displayed by the display device is visible to the user wearing the wearable computing device.

Figure 1A:
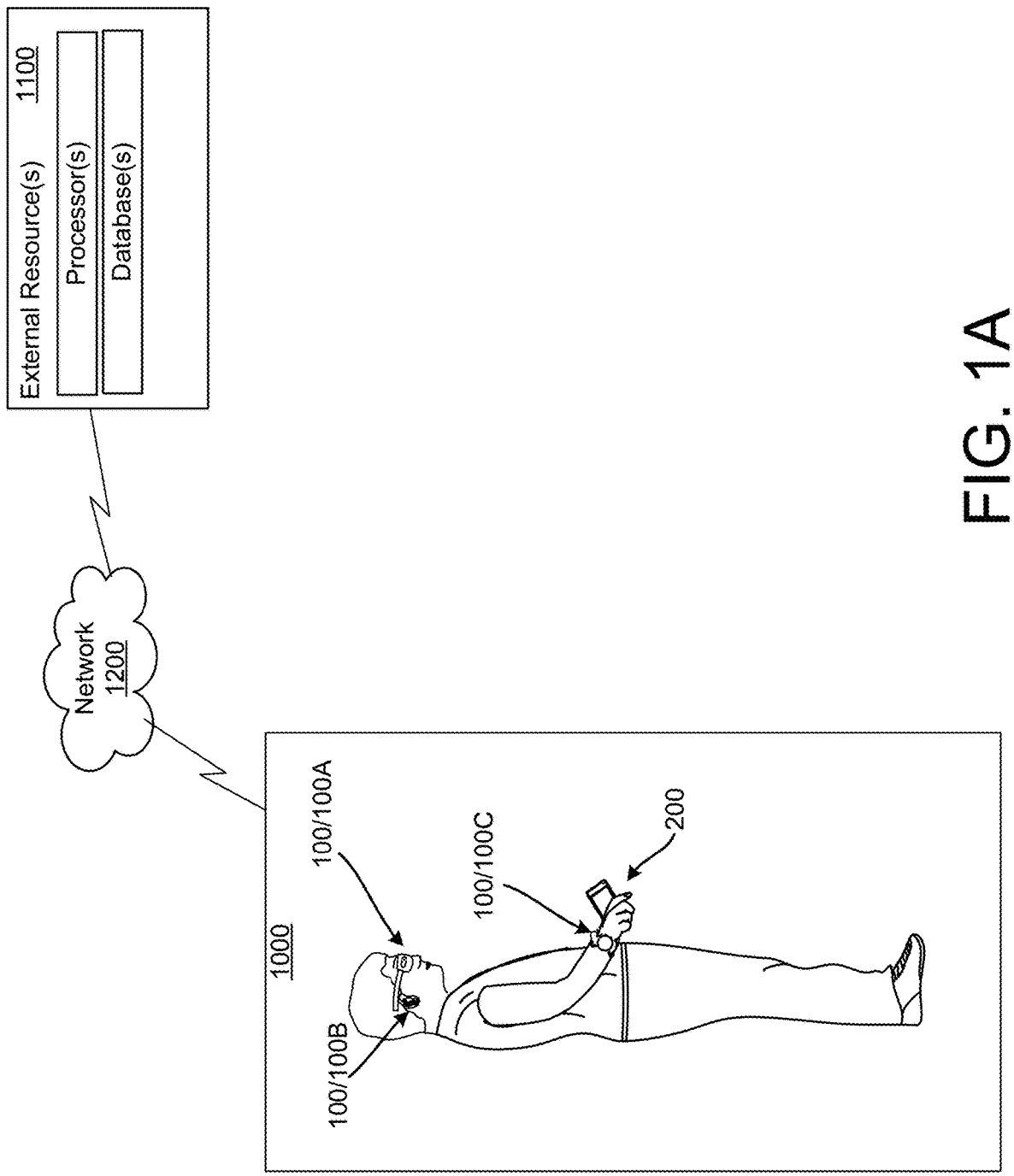
FIG. 1A illustrates an example system, in accordance with implementations described herein.

FIG. 1A illustrates a user operating mobile computing devices in a system in which the mobile computing devices can access one or more external resources 1100 via a network 1200. FIG. 1A provides a third person view of a user in an ambient environment 1000, including various examples of mobile computing devices. FIG. 1A shows example mobile computing devices including a first head worn wearable computing device 100/100A, a second head worn wearable computing device 100/100B, a wrist worn computing device 100/100C, and a handheld computing device 200. In some examples, the first head worn computing device 100A can include various components including for example a display, a camera that can capture images of the ambient environment, audio input/output capability, user input capability and the like, such as in a head mounted display device, in the form of smart glasses, or a headset. In some examples, the second head worn computing device 100B can be an ear worn computing device such as headphones, or earbuds, and can include audio input/output capability, a camera that can capture images of the ambient environment, user input capability and the like. In some examples, the wrist worn computing device 100C can include a display, a camera that can capture images of the ambient environment, audio input/output capability, user input capability and the like, such as in a smart watch, or wristband. In some examples, the handheld computing device 200 can include a display, a camera that can capture images of the ambient environment, audio input/output capability, user input capability, and the like, such as in a smartphone. FIG. 1A illustrates just some examples of mobile computing devices. The principles to be described herein may be applied to other types of mobile computing devices not specifically shown in FIG. 1A. In some examples, the mobile computing devices, including the example computing devices shown in FIG. 1A, can communicate with each other and/or with the external resources 1100, to exchange information, to receive and transmit input and/or output, and the like.

Figure 1B:
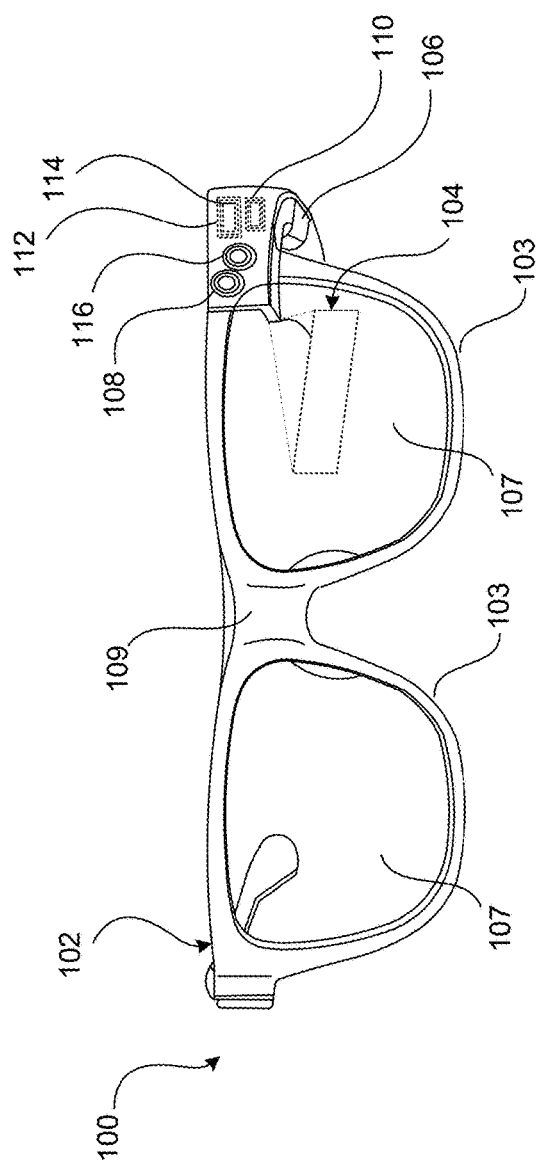
FIG. 1B is a front view.
Figure 1C:
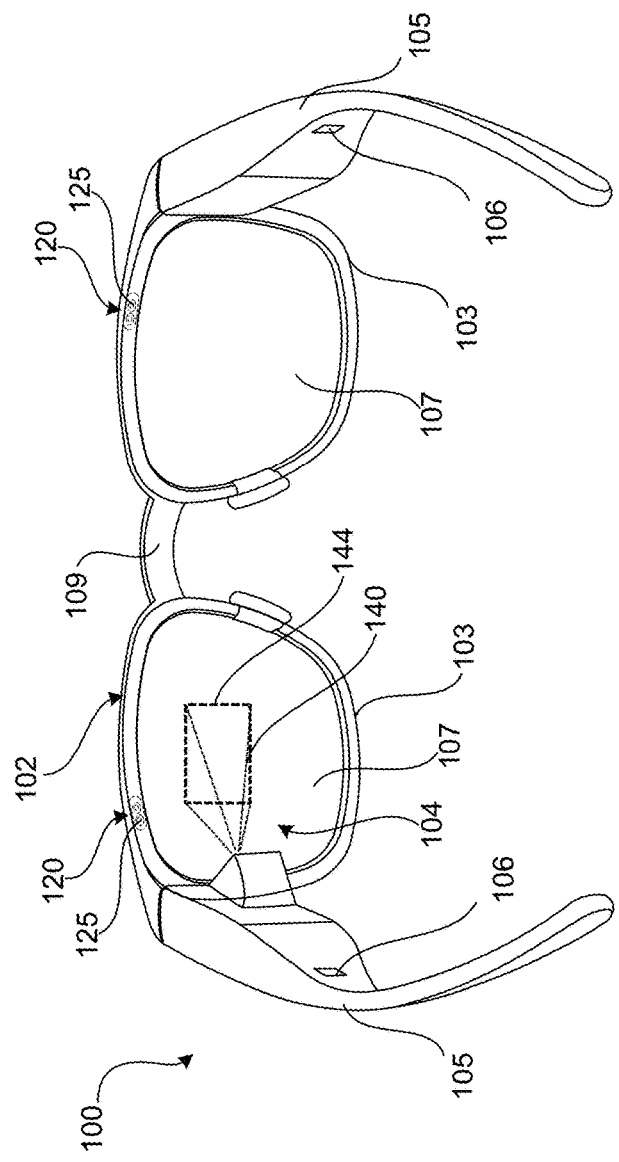
FIG. 1C is a rear view, of an example wearable computing device shown in FIG. 1A, in accordance with implementations described herein.

FIG. 1B is a front view, and FIG. 1C is a rear view, of one example wearable computing device 100, for example, the head mounted wearable computing device 100A shown in FIG. 1A. In some implementations, the example wearable computing device 100 may take the form of a pair of smart glasses, or augmented reality glasses, as in the example shown in FIGS. 1B and 1C, or an augmented reality and/or virtual reality headset or goggles, and the like. Hereinafter, systems and methods in accordance with implementations described herein will be described with respect to the wearable computing device 100 in the form of smart glasses, simply for ease of discussion and illustration. The principles to be described herein can be applied to other types of wearable computing devices and/or combinations of mobile/wearable computing devices working together.

As shown in FIG. 1B, the example wearable computing device 100 includes a frame 102. In the example shown in FIGS. 1B and 1C, the frame 102 includes rim portions 103 surrounding glass portion(s) 107, or lenses 107, and arm portions 105 coupled to a respective rim portion 103. In some examples, the lenses 107 may be corrective/prescription lenses. In some examples, the lenses 107 may be glass portions that do not necessarily incorporate corrective/prescription parameters. In some examples, a bridge portion 109 may connect the rim portions 103 of the frame 102. A display device 104 may be coupled in a portion of the frame 102. In the example shown in FIGS. 1A and 1B, the display device 104 is coupled in the arm portion 105 of the frame 102, with an eye box 140 extending toward the lens(es) 107, for output of content at an output coupler 144 at which content output by the display device 104 may be visible to the user. In some examples, the output coupler 144 may be substantially coincident with the lens(es) 107. The wearable computing device 100 can also include an audio output device 106 (such as, for example, one or more speakers), an illumination device 108, a sensing system 110, a control system 112, at least one processor 114, and an outward facing image sensor 116, or camera 116. In some implementations, the display device 104 may include a see-through near-eye display. For example, the display device 104 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 107, next to content (for example, digital images, user interface elements, virtual content, and the like) generated by the display device 104. In some implementations, waveguide optics may be used to depict content on the display device 104.

In some implementations, the wearable computing device 100 may include a gaze tracking device 120 including, for example, one or more sensors 125, to detect and track eye gaze direction and movement. Data captured by the sensor(s) 125 may be processed to detect and track gaze direction and movement as a user input. In some implementations, the sensing system 110 may include various sensing devices and the control system 112 may include various control system devices including, for example, one or more processors 114 operably coupled to the components of the control system 112. In some implementations, the control system 112 may include a communication module providing for communication and exchange of information between the wearable computing device 100 and other external devices.

Numerous different sizing and fitting measurements and/or parameters may be taken into account when sizing and fitting the wearable computing device 100, such as the example smart glasses shown in FIGS. 1A and 1B, for a particular user. This may include, for example, wearable fit parameters that take into account how a frame 102 fits on a particular user and/or looks and/or feels on a particular user. Wearable fit parameters may take into account, for example whether the frame 102 is wide enough to be comfortable with respect to the user's temples, whether the rim portions 103 and bridge portion 109 are sized so that the bridge portion 109 can rest comfortably on the bridge of the user's nose, whether the arm portions 105 are sized to comfortably rest on the user's ears, and other such comfort related considerations. Wearable fit parameters may take into account as-worn parameters including how the user naturally wears the wearable computing device 100, such as, for example, head posture/how the user naturally holds his/her head, how the user positions the wearable computing device 100 relative to his/her face, and the like. Wearable fit parameters may also take into account whether the size and/or shape and/or contour of the frame 102 is aesthetically pleasing to the user, and is compatible with the user's facial features.

Display fit parameters, or display fit measurements may be taken into account when sizing and fitting the wearable computing device 100 for a particular user. Display fit parameters may provide an indication of placement of the display device 104 so that content displayed by the display device 104 is visible to the user. For example, display fit parameters may provide an indication of placement of the display device 104 so that content displayed by the display device 104 is captured within at least a set portion of the field of view of the user. For example, in some implementations, the display fit parameters may be used to provide at least a set level of gazability, which may correspond to an amount, or portion, or percentage of the display of content that is visible to the user at a set brightness level and a set pupil size at a periphery (for example, a least visible corner) of the field of view of the user. The display fit parameters may be used to configure the display device 104 to provide the best possible placement of the display of content to the user.

Figure 2A:
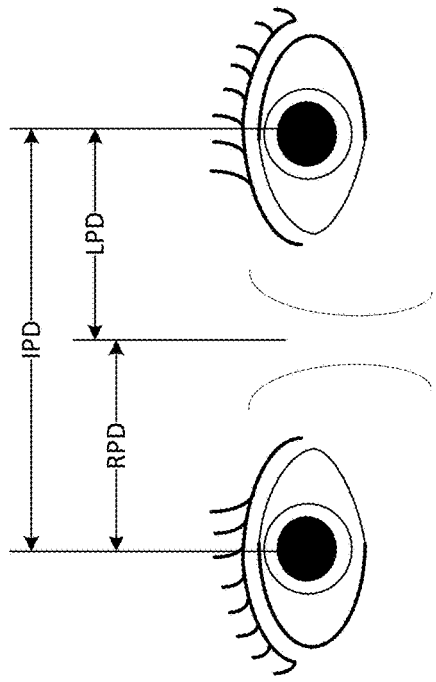
FIGS. 2A-2D illustrate example ophthalmic measurements.
Figure 2B:
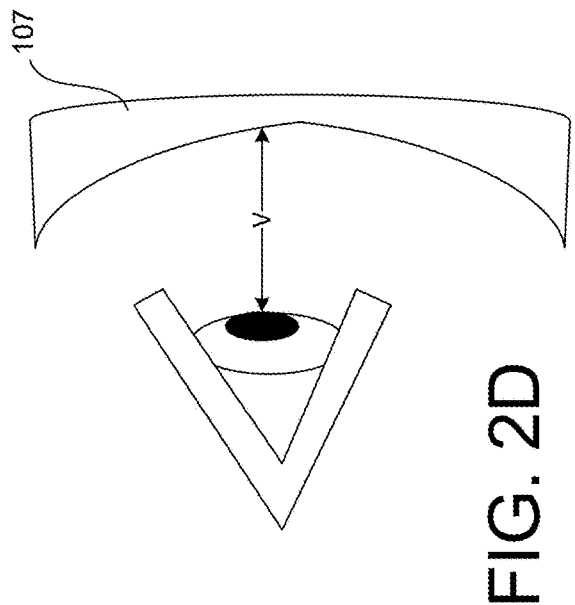
Figure 2C:
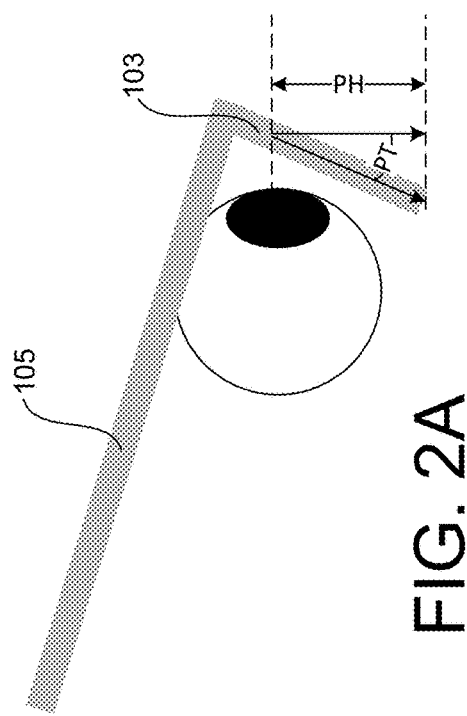
Figure 2D:
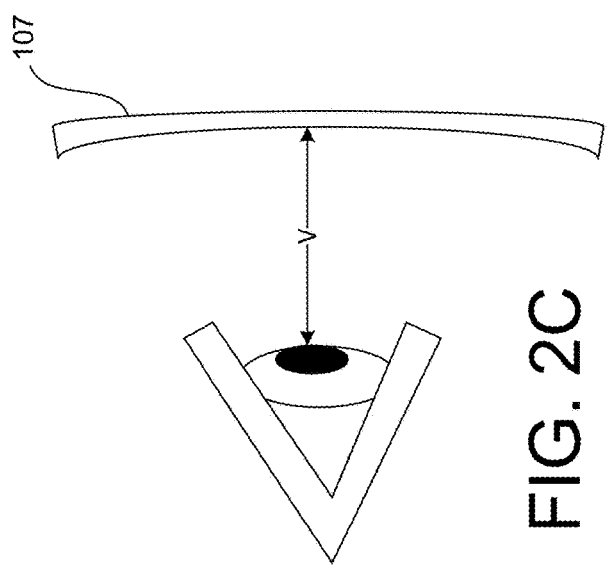

In some examples, ophthalmic fit parameters, or ophthalmic fit measurements may be taken into account when sizing and fitting the wearable computing device 100 in which the lenses 107 are prescription, or corrective lenses. Some example ophthalmic fit measurements are shown in FIGS. 2A-2D. Ophthalmic fit measurements may include, for example, a pupil height PH (a distance from a center of the pupil to a bottom of the lens 107), an interpupillary distance IPD (a distance between the pupils), a monocular pupil distance, for example, a left pupil distance LPD (a distance from a central portion of the bridge of the nose to the left pupil) and a right pupil distance RPD (a distance from the central portion of the bridge of nose to right pupil), a pantoscopic angle PT (an angle defined by the tilt of the lens 107 with respect to vertical), a vertex distance V (a distance from the cornea to the lens 107), and other such parameters, or measures. FIG. 2C illustrates a vertex distance V associated with a relatively low diopter lens 107. FIG. 2D illustrates a vertex distance V associated with a relatively higher diopter lens 107. Ophthalmic fit measurements may be taken into account when fitting the wearable computing device 100, including the display device 104, for the user. For example, ophthalmic fit measurements (together with display fit measurements) may provide for placement of the display of content by the display device 104 within an eye box defined by a three-dimensional volume extending between the lens 107 and the eye of the user, where the display of content will be within the field of view of the user, and thus visible to the user.

A system and method, in accordance with implementations described herein, may use a computing device to capture image based data from which display fit measurements and/or ophthalmic fit measurements may be detected to size and fit a wearable computing device including and display and/or corrective lenses for a specific user. The image capture data may be captured by a user of the computing device in an unsupervised, or unproctored manner, such that the display fit measurements and/or ophthalmic fit measurements may be collected without access to a retail establishment, without the need for an appointment with a fitting/sales professional and the like. In some implementations, the detection of the display fit measurements and/or the ophthalmic fit measurements may be based on detection of visual markers in the image capture data. In some implementations, the visual markers may be provided on sample frames worn by the user included in the image capture data. In some implementations, a three dimensional pose of the sample frames may be determined based on the detection of visual markers in the image capture data. In some implementations, the image capture may be accomplished by the user, in an unsupervised manner, without the need for a separate proctor to capture the image data, either in person or virtually. In some implementations, three-dimensional pose data associated with the positioning of the sample frames on the head/face of the user may be captured by the user, using an application running on a mobile computing device of the user. In some implementations, detection of visual markers in the image capture data may provide for the detection of three-dimensional pose data using an image sensor, or camera, of the mobile computing device of the user without relying on data collected by a depth sensor. In some implementations, three-dimensional pose data may be collected by a depth sensor included in the mobile computing device of the user.

Figure 3:
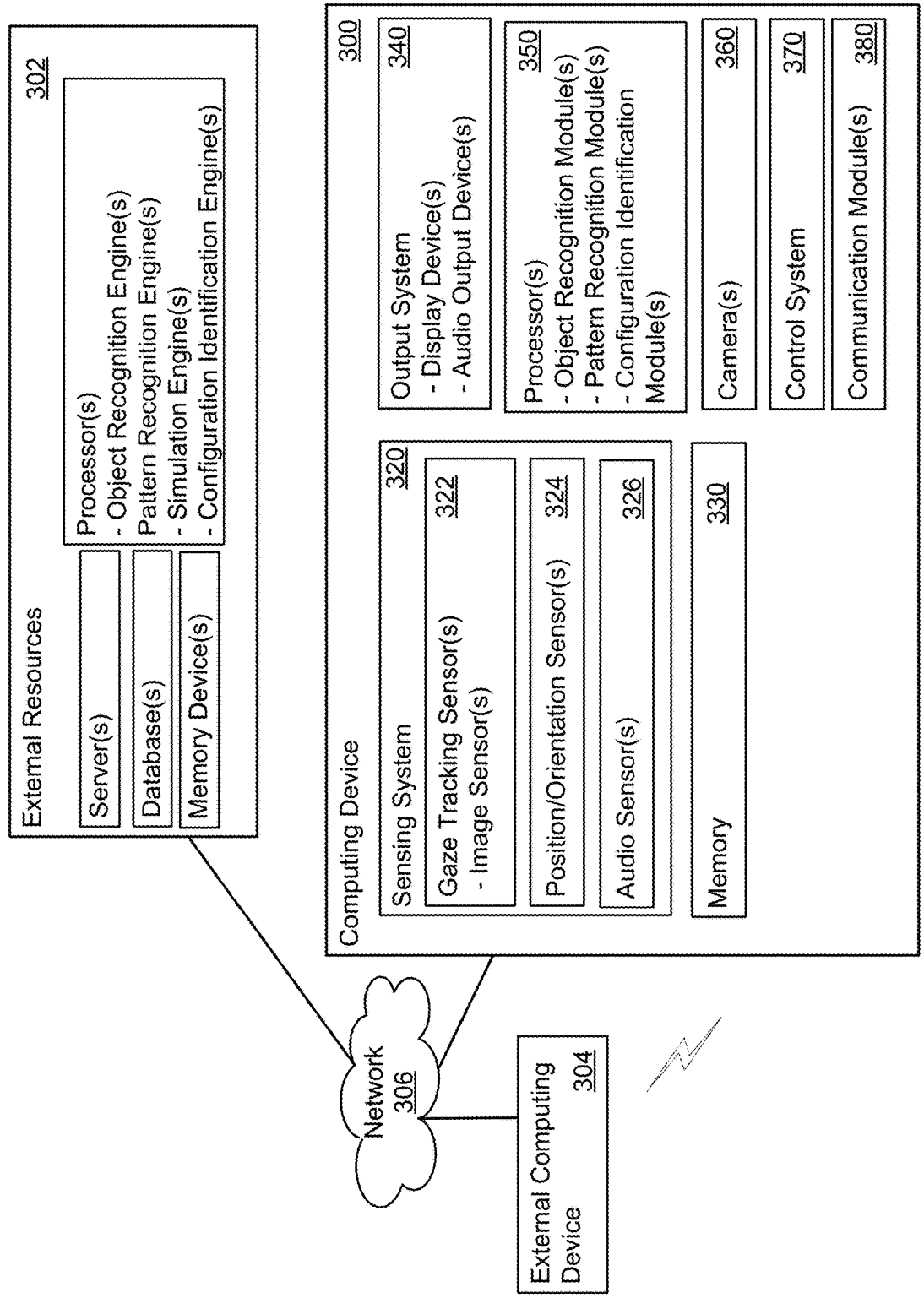
FIG. 3 is a block diagram of a system, in accordance with implementations described herein.

FIG. 3 is a block diagram of an example system for determining display fit measurements and ophthalmic fit measurements for a wearable computing device, in accordance with implementations described herein. The system may include one or more computing devices 300. The computing device 300 can communicate selectively via a network 306 to access external resources 302 such as, for example, server computer systems, processors, databases, memory storage, and the like. The computing device 300 can operate under the control of a control system 370. The computing device 300 can communicate with one or more external computing devices 304 (another wearable computing device, another mobile computing device and the like) either directly (via wired and/or wireless communication), or via the network 306. In some implementations, the computing device 300 includes a communication module 380 to facilitate external communication. In some implementations, the computing device 300 includes a sensing system 320 including various sensing system components including, for example one or more image sensors 322, one or more position/orientation sensor(s) 324 (including for example, an inertial measurement unit, accelerometer, gyroscope, magnetometer and the like), one or more audio sensors 326 that can detect audio input, and other such sensors. The computing device 300 can include more, or fewer, sensing devices and/or combinations of sensing devices.

In some implementations, the computing device 300 may include one or more image sensor(s), or camera(s) 360. The camera(s) 360 can include, for example, outward facing cameras, world facing cameras, and the like that can capture still and/or moving images of an environment outside of the computing device 300. In some implementations, the one or more camera(s) 360 may include a depth sensor. The still and/or moving images may be displayed by a display device of an output system 340 and/or transmitted externally via the communication module 380 and the network 306, and/or stored in a memory 330 of the computing device 300. The computing device 300 may include one or more processor(s) 350. The processors 350 may include various modules or engines configured to perform various functions. In some examples, the processor(s) 350 include object recognition module(s), pattern recognition module(s), configuration identification modules(s), and other such processors. The processor(s) 350 may be formed in a substrate configured to execute one or more machine executable instructions or pieces of software, firmware, or a combination thereof. The processor(s) 350 can be semiconductor-based that include semiconductor material that can perform digital logic. The memory 330 may include any type of storage device that stores information in a format that can be read and/or executed by the processor(s) 350. The memory 330 may store applications and modules that, when executed by the processor(s) 350, perform certain operations. In some examples, the applications and modules may be stored in an external storage device and loaded into the memory 330.

Figure 4A:
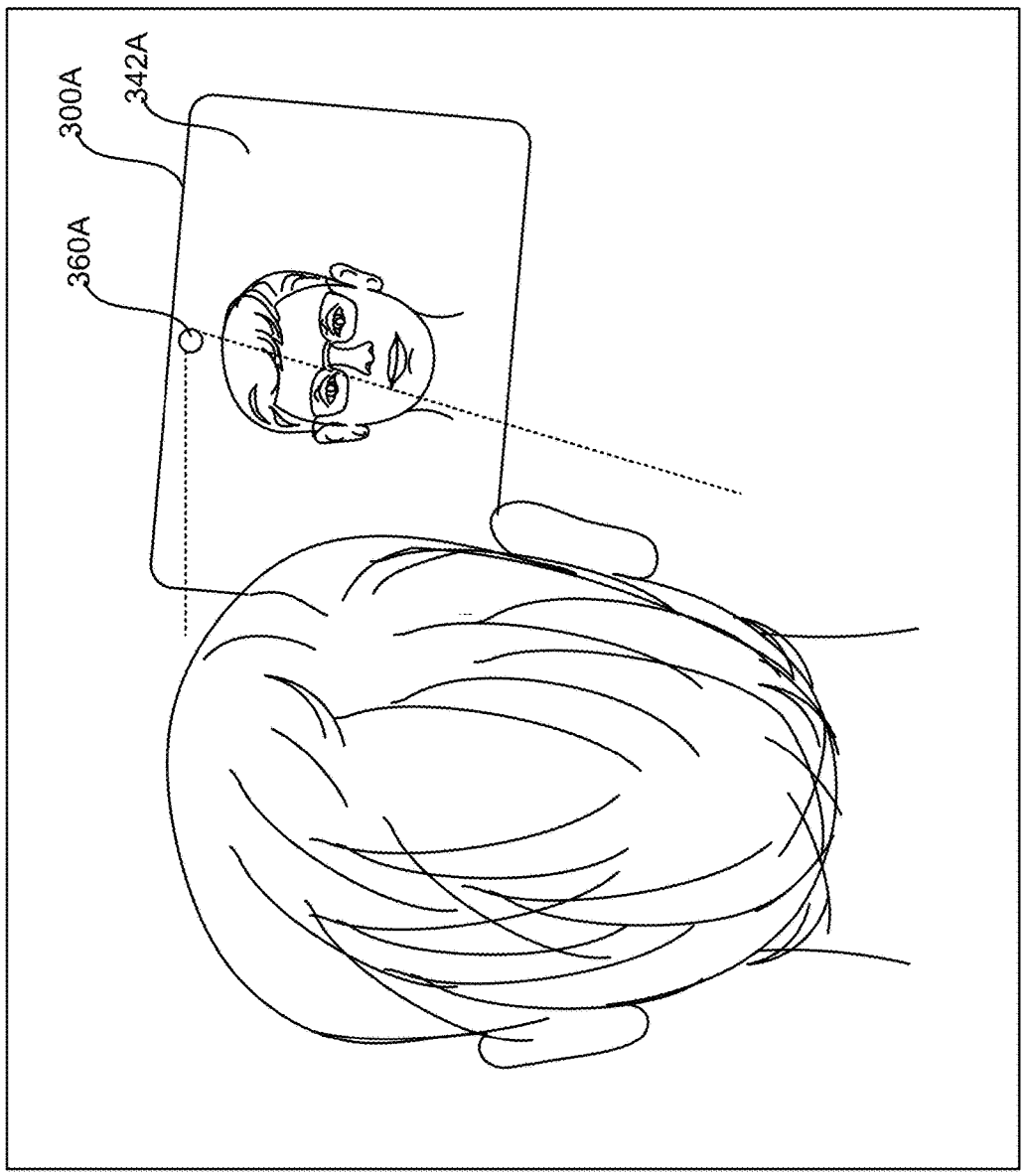
FIGS. 4A-4B illustrate image capture modes for determining display fit measurements and ophthalmic fit measurements, in accordance with implementations described herein.
Figure 4B:
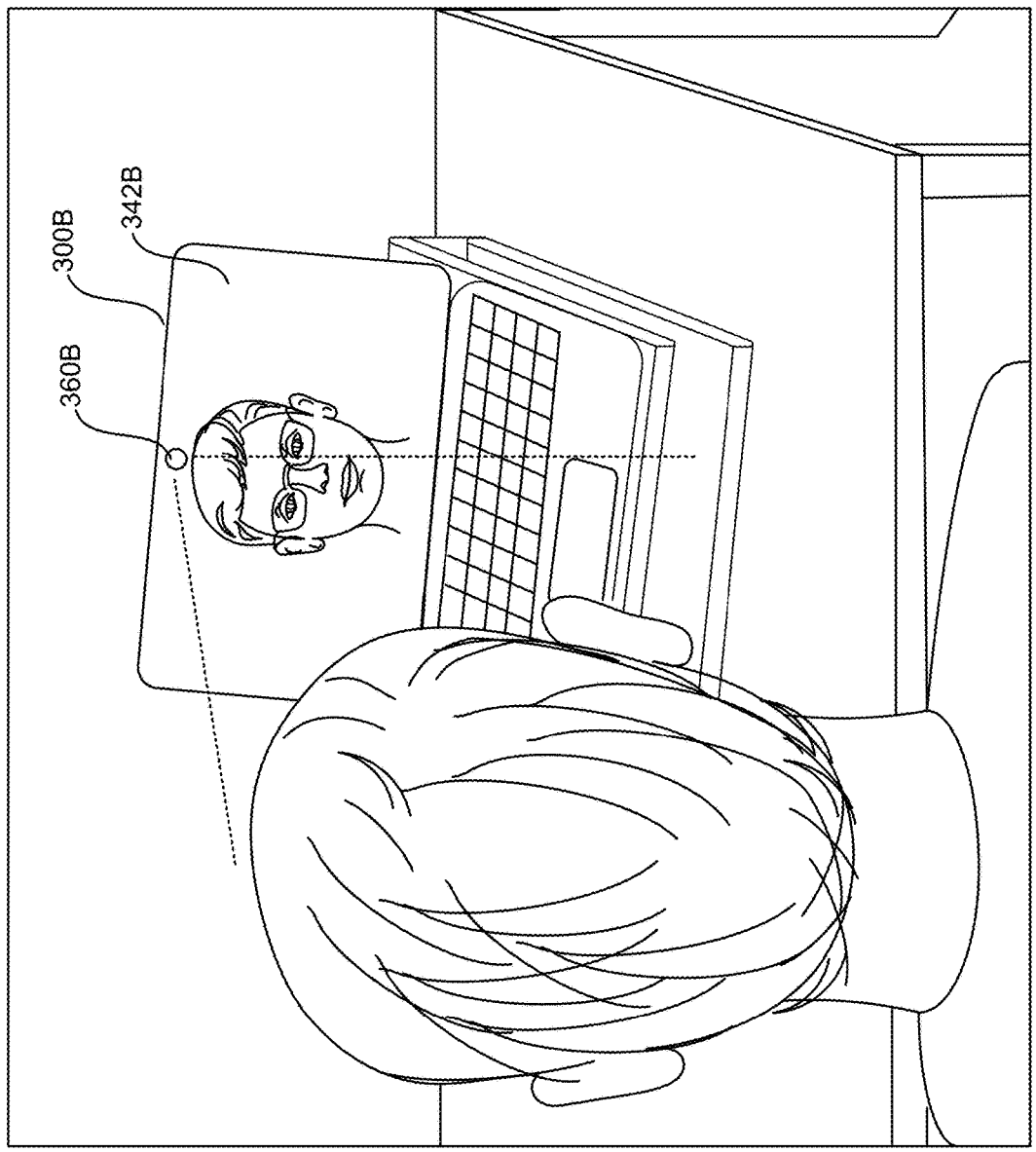

FIGS. 4A and 4B illustrate example computing devices, such as the computing device 300 described above with respect to FIG. 3, operated by a user to capture display fit measurements and/or ophthalmic fit measurements for a wearable computing device to be customized for use by the user. In FIG. 4A, the example computing device 300A is in the form of a handheld computing device, such as a smartphone. In FIG. 4B, the example computing device 300 is in the form of a laptop computing device 300B. FIGS. 4A and 4B provide two examples of computing devices 300 which may be used to capture image data for processing by a sizing simulator to carry out the systems and methods described herein. The principles to be described herein may be carried out by other types of computing devices, and in particular computing devices capable of executing applications thereon to make use of image capture capability, display capability, and external communication and processing to collect and process display fit measurements and/or ophthalmic measurements for customizing a wearable computing device for a particular user.

In the example shown in FIG. 4A, the user is holding the computing device 300A, so that the head and face of the user is in the field of view of a camera 360A of the computing device 300A, and the camera 360A can capture an image of the head and face of the user. The captured image may be displayed to the user on a display device 342A of the computing device 300A, so that the user can verify that his/her head and face are captured within the field of view of the camera 360A. Similarly, as shown in FIG. 4B, the computing device 300B is position relative to the user so that the head and face of the user are captured within the field of view of the camera 360B of the computing device 300B, and the camera 360B can capture an image of the head and face of the user. In the example arrangement shown in FIG. 4B, the computing device 300B is elevated on a work surface, so that the camera 360B of the computing device 300B can be aligned with a natural head and face position of the user. The captured image may be displayed to the user on a display device 342B of the computing device 300B, so that the user can verify that his/her head and face are captured within the field of view of the camera 360B. In the example arrangements shown in FIGS. 4A and 4B, image capture data captured by the camera 360 may be processed (for example, by recognition engine(s) and simulation engine(s) of external processor(s) as shown in FIG. 3) to detect display fit measurements and/or ophthalmic fit measurements, and to determine for example, frame and/or lens sizing and contouring, display device configuration, and the like for the customization of a wearable computing device, such as, for example, the head mounted wearable computing device 100 shown in FIGS. 1B and 1C for the user.

As described above, the detection of display fit measurements and/or ophthalmic fit measurements from the captured image data may be facilitated by the detection of one or more visual markers provided on fitting frames worn by the user during the image capture. In some examples, the user may try on, or sample, a number of different fitting frames from a collection of fitting frames. This may allow the user to assess wearable fit parameters, including for example physical sizing, comfort, aesthetics and the like. The user may use an application running on the wearable computing device 100 to capture image data including the fitting frames (and visual markers) worn by the user, to determine display fit and/or ophthalmic fit. Measurement data collected in this manner may be used to tailor the display device, and in particular, the image display area produced by the display device, for the user based on the measurements detected from the image capture data. Measurement data collected in this manner may be used to incorporate corrective, or prescription lenses into the head mounted wearable computing device. Measurement data collected in this manner may be used to both fit the display device for the user, and also incorporate corrective/prescription lenses into the head mounted wearable computing device.

Figure 5A:
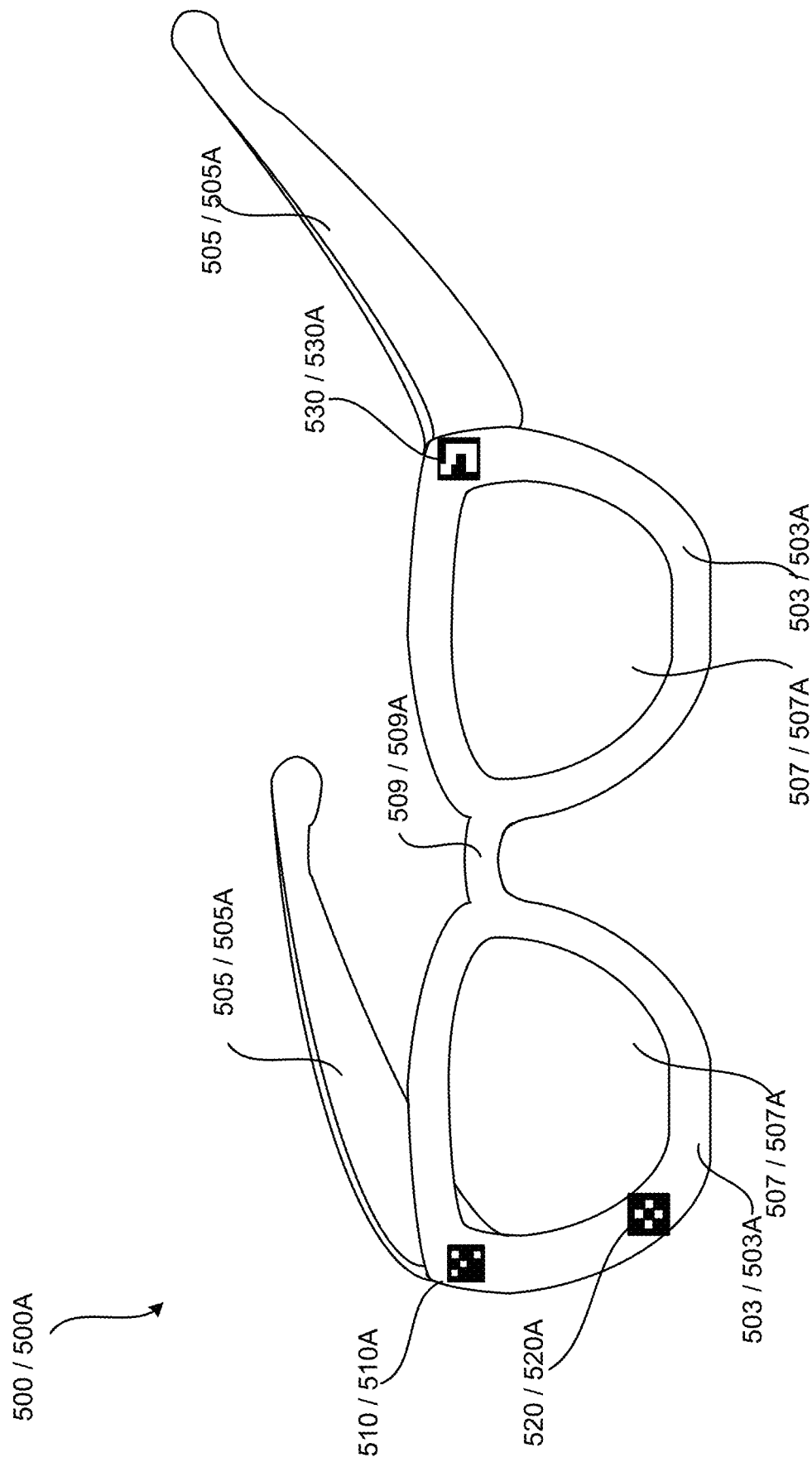
FIGS. 5A-5C are perspective views of example fitting frames, in accordance with implementations described herein.
Figure 5B:
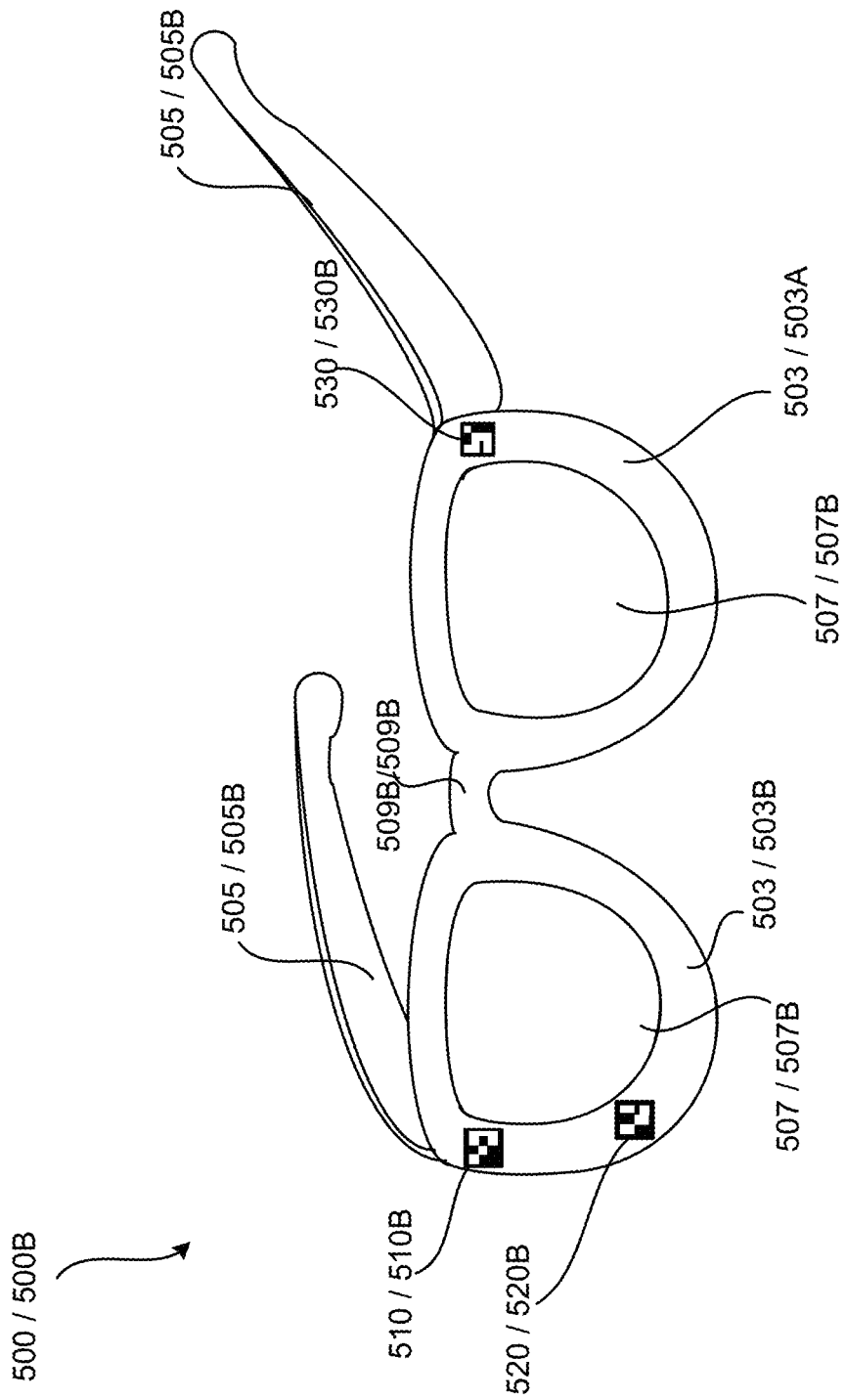
Figure 5C:
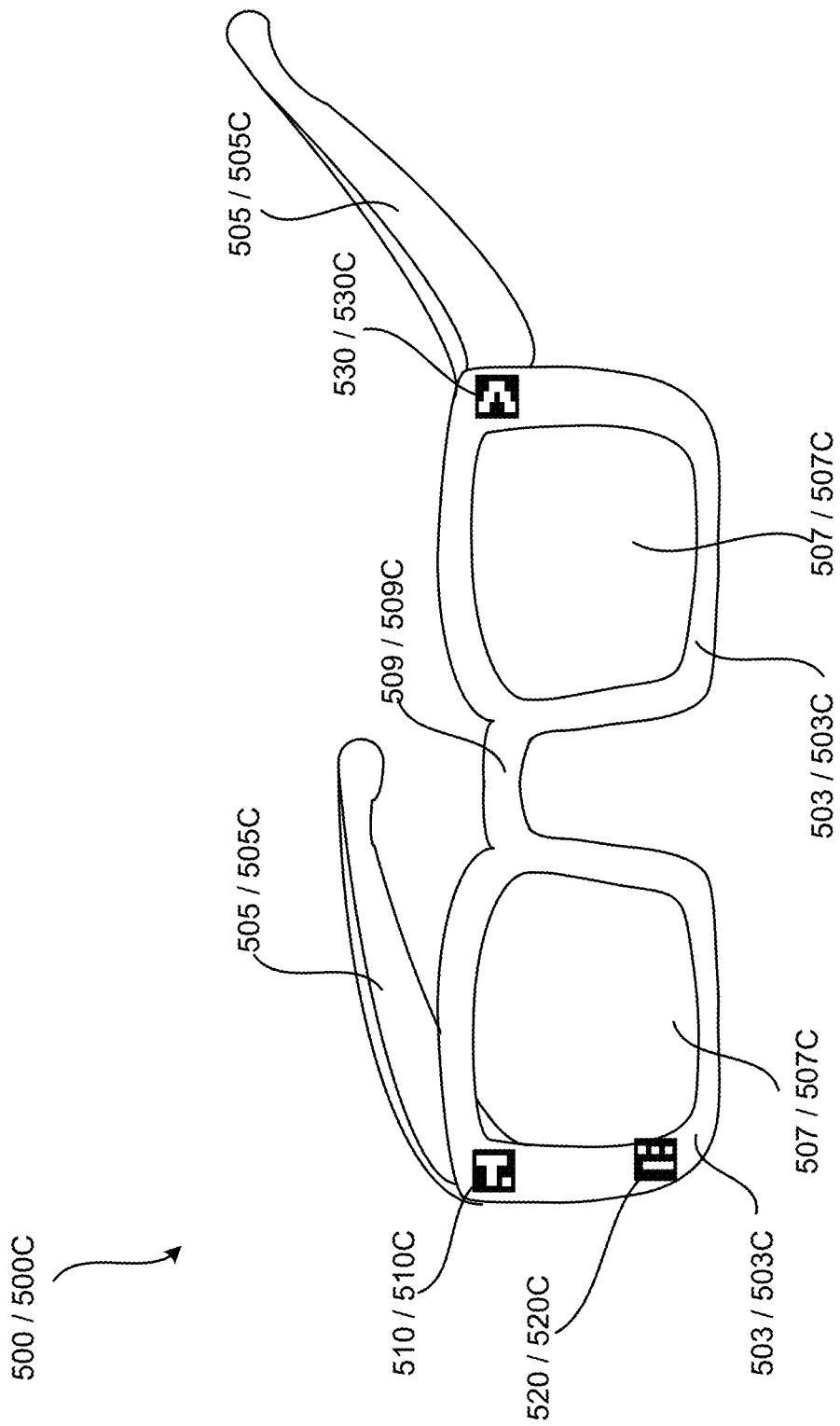

FIGS. 5A-5C illustrate example fitting frames 500 for fitting a head mounted wearable computing device, in accordance with implementations described herein. The example fitting frames 500 may be physically, or geometrically representative of actual frames of a head mounted wearable computing device to be worn by a user, but simply for sizing/fitting purposes, and thus non-functional. A first fitting frame 500A having a first size and/or shape and/or contour is shown in FIG. 5A. A second fitting frame 500B having a second size and/or shape and/or contour is shown in FIG. 5B. A third fitting frame 500C having a third size and/or shape and/or contour is shown in FIG. 5C. Each of the example fitting frames 500 (500A, 500B, 500C) shown in FIGS. 5A-5C includes rim portions 503 (503A, 503B, 503C) surrounding glass portion(s), or lenses 507 (507A, 507B, 507C). A bridge portion 509 (509A, 509B, 509C) may connect the rim portions 503 (503A, 503B, 503C) of the frame 500 (500A, 500B, 500C). Arm portions 505 (505A, 505B, 505C) may be coupled to a respective rim portion 503 (503A, 503B, 503C). In some examples, the arm portions 505 (505A, 505B, 505C) are rotatably coupled to the respective rim portion 503 (503A, 503B, 503C). Three different example fitting frames 500A, 500B, 500C, having different sizing and/or rim shape/contour are shown in FIGS. 5A-5C, simply for purposes of discussion and illustration. The first example fitting frame 500A may be considered to be a medium sized frame having D-shaped rim portions 503A/lenses 507A. The second example fitting frame 500B may be considered to be a medium sized frame having rounded rim portions 503B/lenses 507B. The third example fitting frame 500C may be considered to be a large sized frame having rectangular rim portions 503C/lenses 507C. The principles to be described herein may be applied to fitting frames having other sizes and/or shapes and/or contours, for the display fitting and/or ophthalmic fitting of a head mounted wearable computing device for a particular user.

A fitting frame 500 in accordance with implementations described herein may include at least one visual marker that may be identified, or recognized in an image based data capture including the fitting frame 500. In some implementations, information identifying a configuration of the fitting frame may be detected based on the detection of the at least one visual marker in the image based capture data. In some implementations, a three dimensional pose of the fitting frame 500 may be determined based on the detection of the at least one visual marker in the image based capture data. In some implementations, the fitting frame 500 may include a plurality of visual markers. In some examples, the plurality of visual markers may provide for the collection of additional information (when compared to a single visual marker provided on the fitting frame 500) related to the fitting of the head mounted wearable computing device for a particular user. In some examples, the plurality of visual markers (for example, in may provide for improved identification of the configuration of the fitting frame 500, for a more accurate characterization of the three-dimensional pose of the fitting frame 500, and the like (when compared to a single visual marker provided on the fitting frame 500). Example fitting frames 500 (500A, 500B, 500C) including a first visual marker 510 (510A, 510B, 510C), a second visual marker 520 (520A, 520B, 520C) and a third visual marker 530 (530A, 530B, 530C) will be used hereinafter to describe principles related the systems and methods for fitting (display fitting and/or ophthalmic fitting) a head mounted wearable computing device to a user.

As shown in FIGS. 5A-5C, each of the example fitting frames 500 includes a first example visual marker 510 at a first position on the example fitting frame 500, a second example visual marker 520 at a second position on the example fitting frame 500 and an example third visual marker 530 at a third position on the example fitting frame 500. In the example arrangements shown in FIGS. 5A-5C, the markers 510, 520, 530 are substantially square, or rectangular. In some examples, one or more of the markers 510, 520, 530 may have another shape. In the example arrangements shown in FIGS. 5A-5C, the markers 510, 520, 530 include a pattern within the marker 510, 520, 530. The pattern included in the marker 510, 520, 530 may provide information related to, for example, identification of the configuration of the particular fitting frame 500 to which the marker 510, 520, 530 is attached, position and/or orientation of the frame 500 relative to the image capture device, and other such information. In the example arrangements shown in FIGS. 5A-5C, all three of the example markers 510, 520, 530 have a substantially square/rectangular shape and include a pattern within the boundary of the respective marker 510, 520, 530. In some examples, a fitting frame may include markers having different shapes and/or combinations of shapes. In some examples, a fitting frame may include some markers including a pattern, and some markers that do not include a pattern.

In the example shown in FIGS. 5A-5C, the first, second and third markers 510, 520, 530 are defined by a substantially rectangular boundary, such that each of the first, second and third markers 510, 520, 530 includes four corners. The four corners of the first, second and third markers 510, 520, 530 (i.e., twelve corners) may themselves serve as markers (i.e., twelve markers), or indices (i.e., twelve indices) lying in a single plane (i.e., the plane of the front face of the fitting frame 500). In some examples, detection of the twelve markers, or twelve indices, defined by the twelve corners of the first, second and third markers 510, 520, 530 may provide the information necessary to determine a three-dimensional pose of the fitting frame 500. That is, detection of the pattern within one or more of the markers 510, 520, 530 may allow the configuration of the fitting frame 500 to be identified. The configuration may include, for example, a size of the fitting frame 500, a contour of the rim portions 103/lenses 107 of the fitting frame 500, a length of the bridge portion 109, a length of the temple arm portions 105, a distance between the temple arm portions 105, a tilt angle of the rim portions 103/lenses 107 relative to the temple arm portions 105, and other such information. Given the known configuration of the fitting frame 500, the twelve markers, or twelve indices, defined by the twelve corners of the markers 510, 520, 530 may then provide the information necessary to determine the three-dimensional pose of the fitting frame 500, particularly given the known configuration of the fitting frame 500.

Figure 6A:
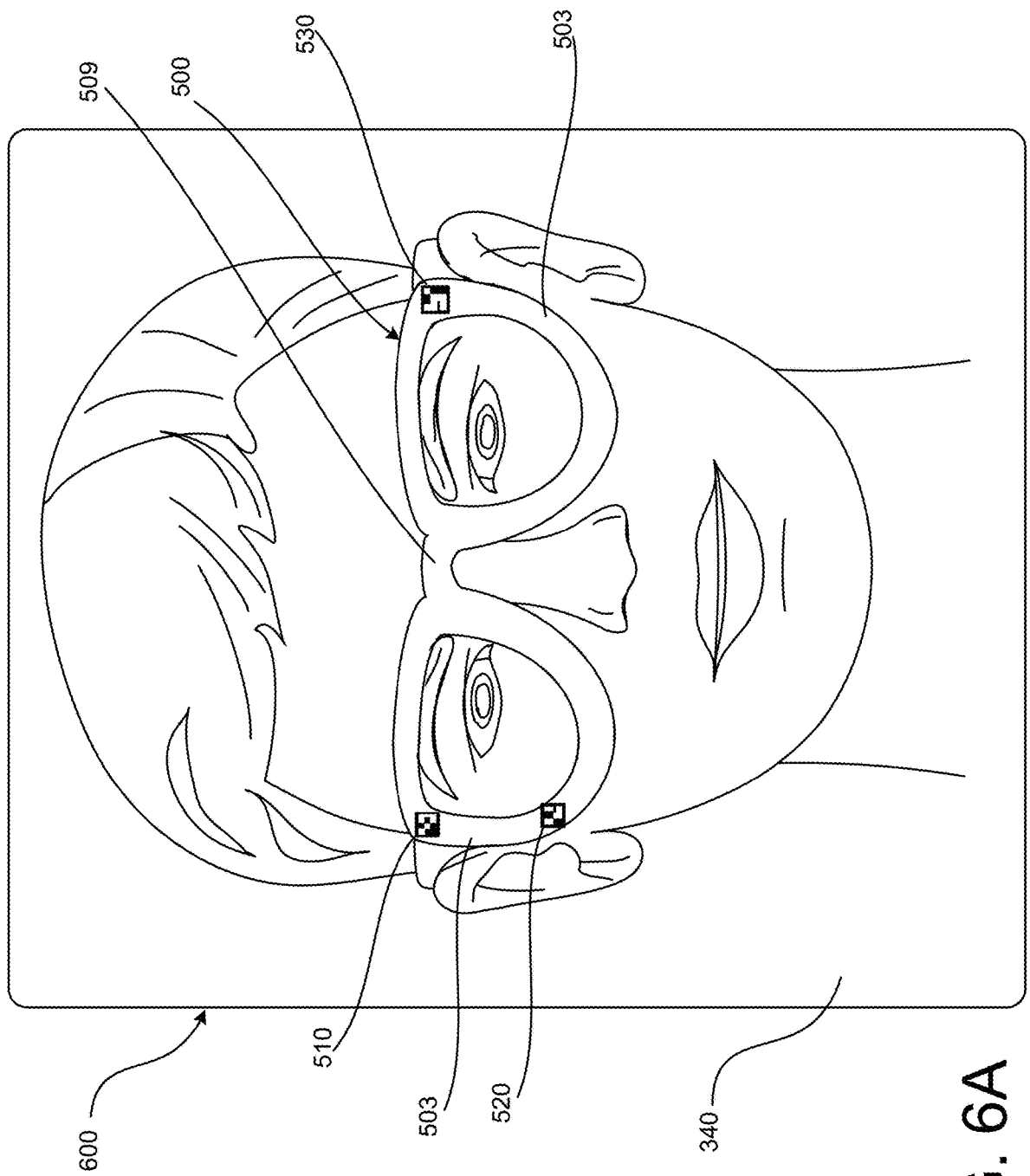
FIGS. 6A-6E illustrate the detection of visual markers and facial features for determination of three dimensional pose of the example fitting frames shown in FIGS. 5A-5C, and for the detection of ophthalmic measurements, in accordance with implementations described herein

FIG. 6A illustrates an example image 600 of a user wearing the example fitting frame 500 including the first, second and third example markers 510, 520, 530. As described above, the example image 600 may be captured by the camera 360 of the computing device 300 operated by the user, through an application executed by the computing device 300. In some examples, gazability may be determined, to confirm that content displayed by the display device of a head mounted wearable computing device having a particular frame configuration will be visible to the user. Measurements to determine gazability may be detected based on image data captured by the camera of the computing device 300, of the user wearing the corresponding fitting frame 500.

Figure 6B:
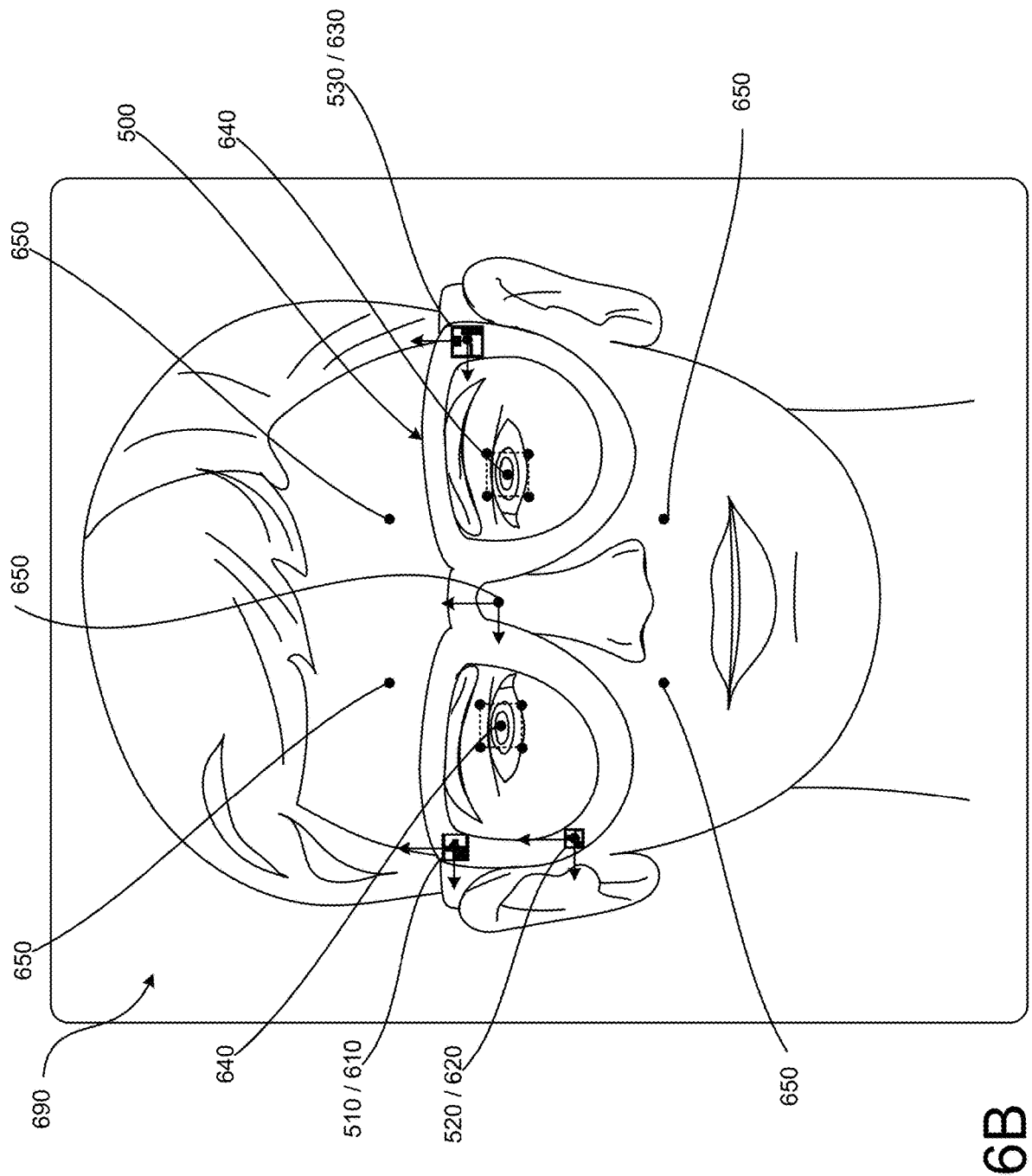

In some examples, pose data (i.e., position data and orientation data) may be detected to determine gazability of selected configuration of frame for a particular user. Gazability may be determined based on a detected pose of the camera 360 of the computing device, a detected pose of the fitting frame 500, and a detected pose of the pupils of the user wearing the fitting frame 500. In detecting these measurements, a two-dimensional image plane, a three dimensional camera space, and a three dimensional frame space may be taken into account. Features detected or measured from the two-dimensional image plane 690 are illustrated in FIG. 6B.

The two-dimensional image plane 690, or image space 690 may be represented by a two-dimensional array of pixels captured by the camera 360. In some examples, the markers 510, 520, 530, and corresponding positions 610, 620, 630 (for example, coordinate positions) of the markers 510, 520, 530 may be detected in the two-dimensional image plane 690. In some examples, pupils, and in particular a pupil center 640 for each eye of the user, may be detected in the two-dimensional image plane 690. In some examples, other facial landmarks 650 may be detected in the two-dimensional image plane. In the example shown in FIG. 6B, facial landmarks include the bridge of the nose, a quadrant surrounding the bridge of the nose at the temple and cheeks, simply for purposes of discussion and illustration. Other facial landmarks may be detected to facilitate the identification of features related to positioning of the fitting frame 500 on the head/face of the user. In some examples, features detected in the two-dimensional image plane 690 may be measured in pixels, or pixel units. For example, a vertex distance V, representing the distance between the surface of the eye and the lens 507, may be detected based on, for example a known reference point or object also in the image that may provide for scale in the image, a previously known interpupillary distance IPD for the user, iris size, or other such factors.

Figure 6C:
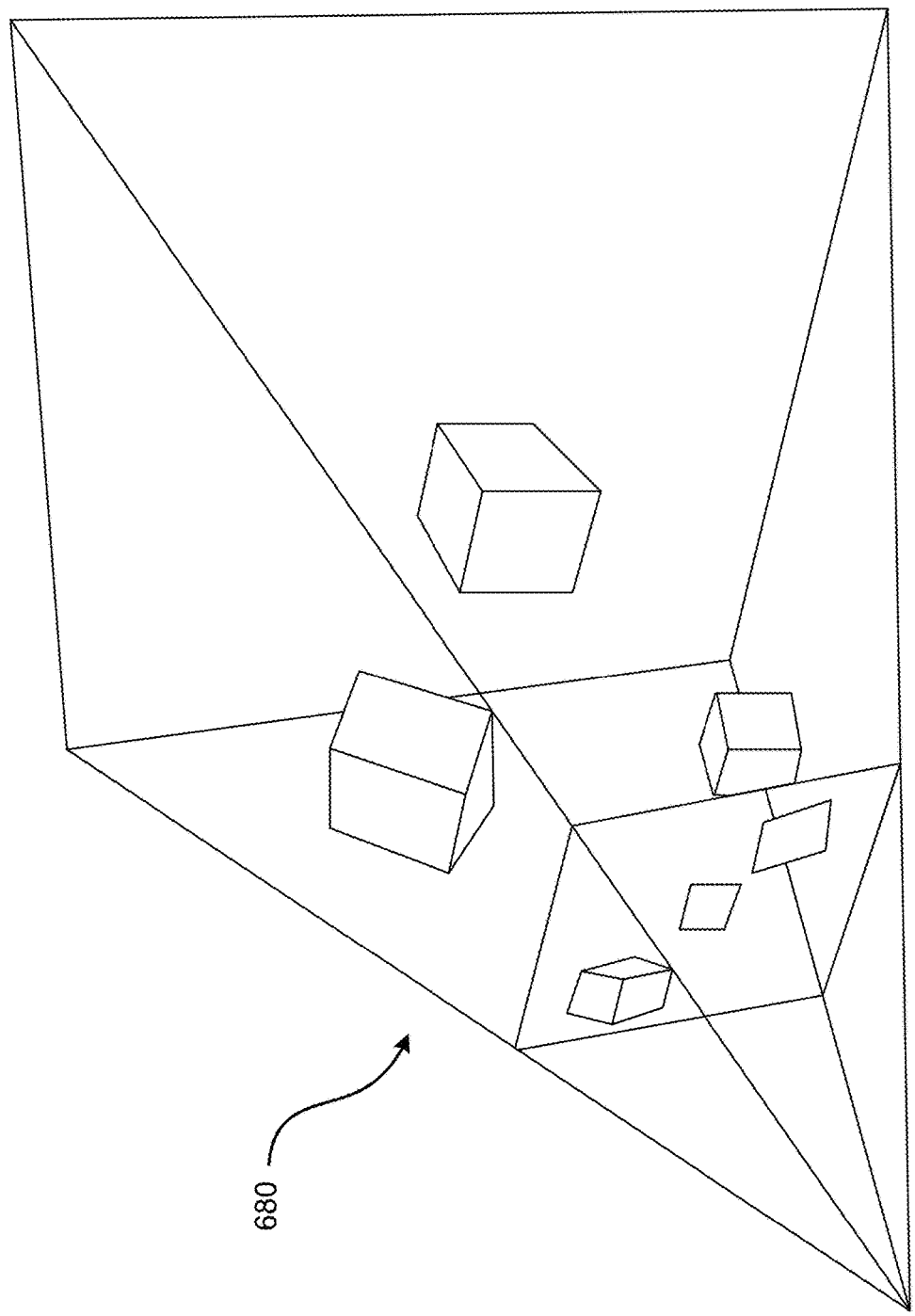

A schematic illustration of the three-dimensional camera space 680 is illustrated in FIG. 6C. The three-dimensional camera space 680 may allow the system to determine distances between features detected in the two-dimensional image plane 690. The three-dimensional camera space 680 may provide for three-dimensional rotation of the detected features, which in turn may provide for the determination of ophthalmic measurements such as pupil height, pantoscopic angle (or pantoscopic angle), vertex distance and other such measures.

Figure 6D:
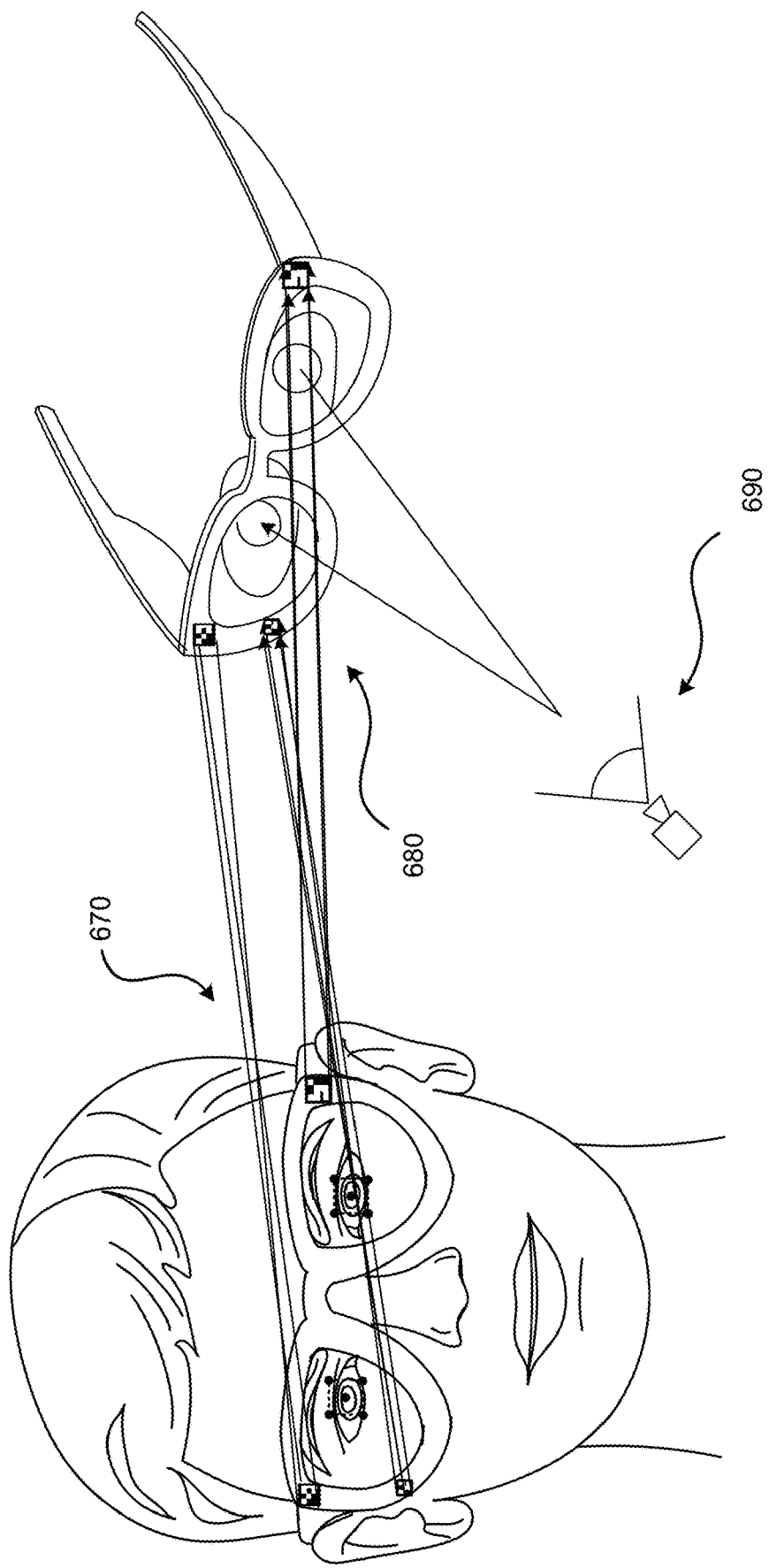

The three-dimensional fitting frame space 670 is illustrated in FIG. 6D. The fitting frame space 670 may provide a three-dimensional model of the identified fitting frame 500. For example, the fitting frame space 670 may provide a three-dimensional model of the configuration of the fitting frame 500 that has been identified by the system based on the detection of the markers 510, 520, 530 and the recognition of patterns in one or more of the markers 510, 520, 530 identifying the configuration of the fitting frame 500 captured in the image plane 690. The three-dimensional model of the identified fitting frame 500 may include known measurements, dimensions, contours, distances and the like associated with the configuration of the fitting frame 500 (rim portions 503, bridge portion 509, temple arm portions 105 and connection points to the rim portions 503, and the like). The three-dimensional model of the identified fitting frame 500 may include measurements such as, for example, relative distances between markers 510, 520, 530.

In some examples, data provided by the two-dimensional image plane 690, the three-dimensional camera space 680, and the three-dimensional fitting frame space 670 may be synthesized to determine gazability of the fitting frame 500 for the user. Transition between the image space 690 and the camera space 680, and the camera space 680 to the fitting frame space 670 relies on a common piece of information shared between the two respective spaces.

In transitioning the detected measurement data from the image plane 690 to the camera space 680, a depth d at each pixel of the image plane 690 (for example, in mm, or other measurement unit) and a coordinate location of the image $p_x/p_y$ (for example, in pixels, or pixel units) may be known. Characteristics of the camera 360 of the computing device 300 such as, for example focal length $f_x/f_y$ (in pixels, or pixel units) and principal point $c_x/c_y$ (in pixels, or pixel units), may also be known. Given the depth d and coordinate location of the image $p_x/p_y$, the focal length $f_x/f_y$ and principal point $c_x/c_y$, the point $(t_x, t_y, d)$ in camera space 680 may be determined using equation [1] and equation [2] below.

$$t_x = d*(p_x - c_x)/f_x \quad [1]$$

$$t_y = d*(p_y - c_y)/f_y \quad [2]$$

Figure 6E:
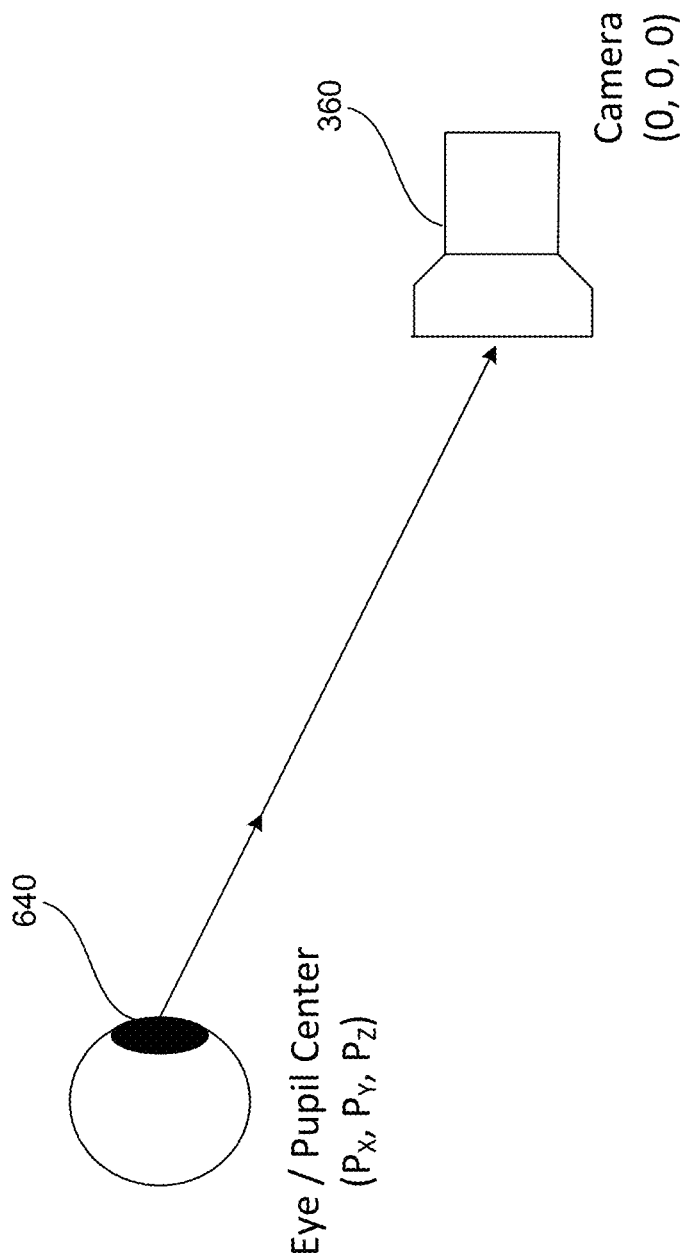

In some examples, the two-dimensional position $[p_x, p_y]$ of the eyes, or the pupil centers 640 may be detected in the image plane 690. A depth may be associated with the detection of the two-dimensional position, together with a depth relative to the camera 360 of the computing device 300 operated by the user, to determine a three-dimensional position, or pose $[p_x, p_y, p_z]$ of the pupil center 640 relative to the camera 360, as shown in FIG. 6E. In some examples, depth may be detected based on a measurement provided by a depth sensor of the computing device 300. In some examples, depth may be determined based on the detected position and determined orientation of the markers 510, 520, 530 relative known position and orientation of the markers 510, 520, 530 on the fitting frame 500.

In transitioning the detected measurement data from the camera space 680 to the fitting frame space 670 relies on a point of reference on the fitting frame 500 whose position and orientation can be determined in the camera space 680. In some examples, this may be provided by one or more markers provided on the fitting frame 500, for example the three markers 510, 520, 530 included in the example fitting frames 500 described above. That is, the location and the orientation of one or more of the markers 510, 520, 530 can be detected in both the camera space 680 and in the fitting frame space 670. A three-dimensional point $P_F$ [x, y, z] in the fitting frame space 670 may be determined by equation [3] below.

$$P_F = R_F(R_C^{-1}(P_C - T_C)) + T_F \quad [3]$$

In equation [1], $P_C$ may represent a point [x, y, z] in the camera space 680. $R_C$ may represent a 3×3 rotation matrix [x, y, z] of each of the one or more markers 510, 520, 530 in the camera space 680, and $T_C$ may represent an [x, y, z] position of each of the one or more markers 510, 520, 530 in the camera space 680. $R_F$ may represent a 3×3 rotation matrix [x, y, z] of each of the one or more markers 510, 520, 530 in the fitting frame space 670, and $T_F$ may represent an [x, y, z] position of each of the one or more markers 510, 520, 530 in the fitting frame space 670.

As noted above, the markers 510, 520, 530 detected on the fitting frame 500 (three example markers 510, 520, 530 in the example fitting frames 500 described above) may be detected in the image data captured by the camera 360 of the computing device 300 operated by the user. Similarly, a center of each pupil 640 may be detected in the image data captured by the camera 360 of the computing device 300 operated by the user. Other facial landmarks 650 may also be detected in the image data captured by the camera 360 of the computing device 300 operated by the user. The facial landmarks 650 may provide, for example, indexing for positioning of the fitting frames 500 relative to the user's head/face, and the like.

As noted above, three-dimensional pose information for the markers 510, 520, 530 may be detected based on the detection of distinguishing features of the markers 510, 520, 530. For example, the detection of corners of the markers 510, 520, 530 and comparison to known sizing, contours, positioning and the like of the markers 510, 520, 530 may provide three-dimensional pose information related to the position of the fitting frame 500. Similarly, three-dimensional pose information related to the pupils and the face of the user, together with the three-dimensional pose information of the fitting frame 500, may allow for the determination of lens measurements (for example, pupil height, vertex distance, pantoscopic angle and the like).

As noted above, the three-dimensional position and orientation, or pose, of the fitting frame 500 may be determined based on detection and/or identification of the markers 510, 520, 530 in the image captured by the camera 360 of the computing device 300 operated by the user. The fitting frame 500 may be considered to be a substantially rigid body, with three degrees of movement. Thus, the precise detection of one known point on the fitting frame 500 may be used to determine the three-dimensional position of the fitting frame

500. One or more of the markers 510, 520, 530 may be reliably detectable in the image plane 690, and a position of the detected one or more markers 510, 520, 530 is known in the fitting frame space 670. That is, the position of the one or more markers 510, 520, 530 on a particular fitting frame 500 is known, based on the identification of the configuration of the fitting frame 500 from the detection of the pattern in one or more of the markers 510, 520, 530.

Figure 7A:
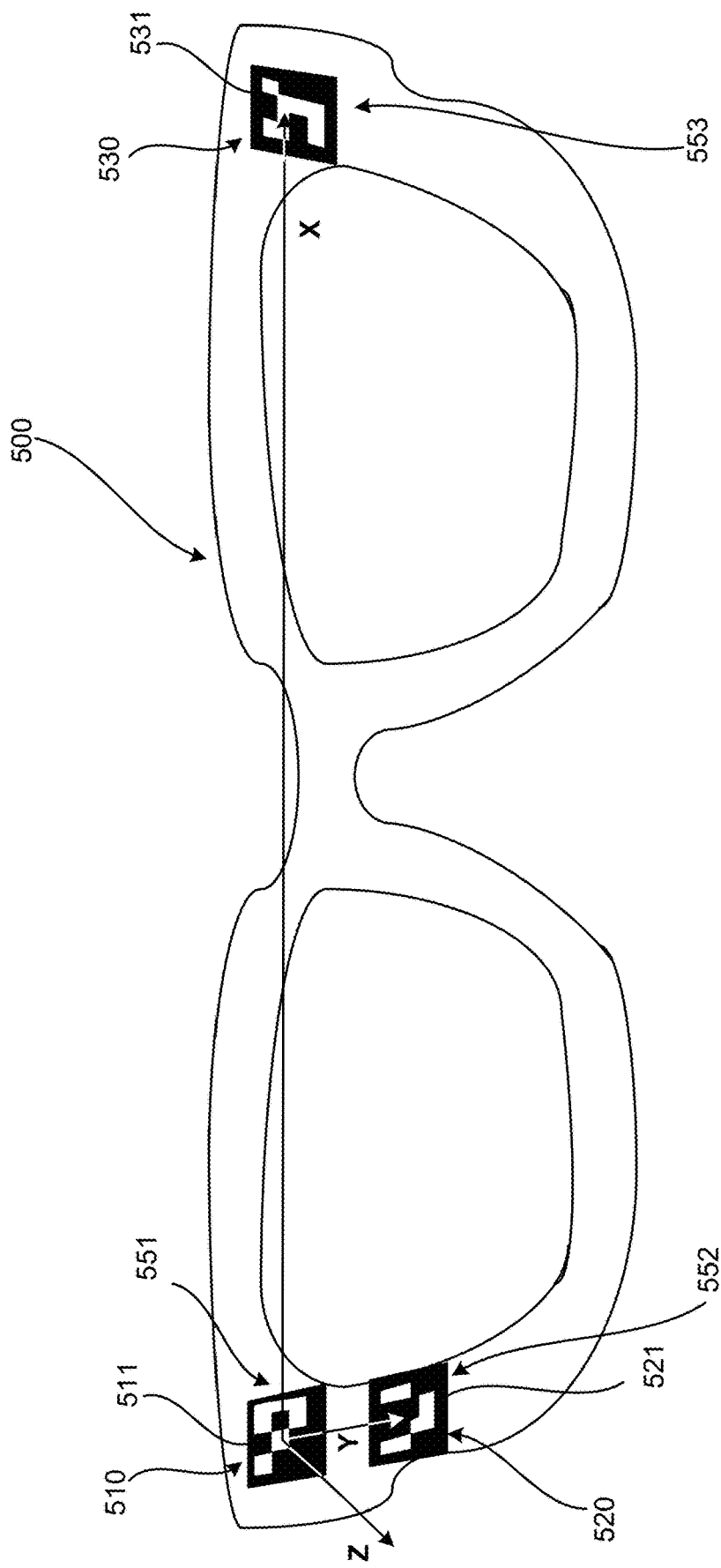
FIGS. 7A-7C illustrate example visual markers provided on the example fitting frames shown in FIGS. 5A-5C, in accordance with implementations described herein.

As shown in FIG. 7A, in this example, the fitting frame 500 includes three markers 510, 520, 530, each including four corners. The four corners of at least one of the markers, or of two of the markers, or all three of the markers 510, 520, 530 may be detected in the image plane 690. Identification information, related to the specific configuration of the fitting frame 500 to which the marker is attached, may be detected from the pattern included in at least one of the markers 510, 520, 530. In the example arrangement shown in FIG. 7A, each marker 510, 520, 530 includes a distinct pattern, so that the first marker 510, the second marker 520 and the third marker 530 can be distinguished, for example, visually distinguished from each other. In this example arrangement, the first marker 510 including the first pattern 511 is located at a first known position 551 on the fitting frame 500. Similarly, the second marker 520 including the second pattern 521 is located at a second known position 552 on the fitting frame 500, and the third marker 530 including the third pattern 531 is located at a third known position 553 on the fitting frame 500. In this example arrangement, the patterns 511, 521, 531 may provide information used to identify the configuration of the fitting frame 500 as described above. In this example arrangement, detection of the first pattern 511 may identify the first marker 510, thus marking the corresponding first known position 551 on the fitting frame 500. Similarly, detection of the second pattern 521 may identify the second marker 520, thus marking the corresponding second known position 552 of the fitting frame 500, and detection of the third pattern 531 may identify the third marker 530, thus marking the corresponding third known position 553 on the fitting frame 500. This may provide three fixed points of reference on the fitting frame 500 in order to detect and/or refine the three-dimensional pose of the fitting frame 500.

In the example shown in FIG. 7A, the centers of each of the first, second and third markers 510, 520, 530 can be identified from the detected four corners of the respective marker 510, 520, 530. The center of each marker 510, 520, 530 can be assumed to be a planar point that can be projected into the camera space 680. Detected features surrounding the center of each marker 510, 520, 530 can be compared to known features (known position, geometry, contour, distance and the like) to determine depth. An X axis of the fitting frame 500 in three-dimensional space may be defined by a ray extending from the center of the first marker 510 to the center of the third marker 530. The Y axis of the fitting frame 500 in three-dimensional space may be defined by a ray extending from the center of the first marker 510 to the center of the second marker 520. The Z axis of the fitting frame 500 in three-dimensional space may be defined by the cross-product of the X axis and the Y axis.

Figure 7B:
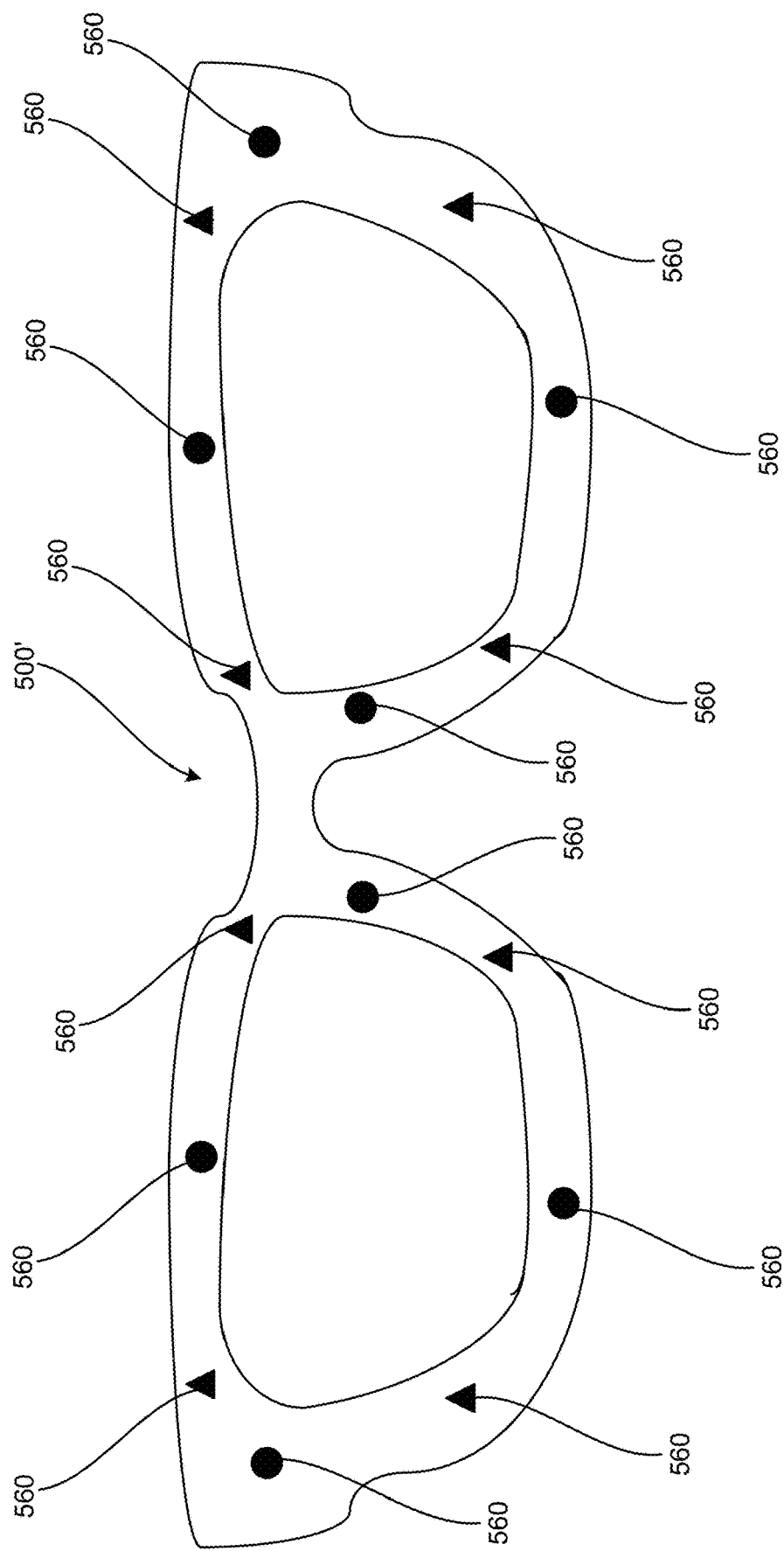

FIG. 7B illustrates an example fitting frame 500' including a plurality of markers 560. In this example, the plurality of markers 560 form a pattern of geometric shapes that can be detected in the image captured by the camera 360 operated by the user. In some examples, each configuration of fitting frame available to a user may have a different or unique pattern of markers 560 to uniquely identify the fitting frame 500'. Detection and identification of the pattern formed by the plurality of markers 560 may facilitate identification of the configuration of the fitting frame 500'. Comparison of the pattern formed by the markers 560 (i.e., a relative size, perspective, distance between adjacent markers and the like) as detected in the image captured by the camera 360 to a known pattern (and known size, perspective, distance and the like) may be used to derive pose information related to the fitting frame 500'.

The measurements, or parameters described above may be collected to determine display fit characteristics for a user wearing a selected fitting frame 500. The measurements, or parameters described above may allow for fitting of the display device of the head mounted wearable computing device (such as the display device 104 of the head mounted wearable computing device 100 shown in FIGS. 1A and 1B) such that the pupil of the user will be as centrally aligned as possible within the eye box 140, so that the user eye gaze passes through the output coupler 144, where displayed content is visible to the user on the lens 107. The measurements, or parameters described above may allow for selection of a frame for a wearable computing device, from amongst a plurality of different available frames, that will provide proper display fit in this manner, such that the display of content is visible to the user within a relatively large portion of the field of view of the user.

Systems and methods, in accordance with implementations described herein, may provide for the collection of measurements to determine ophthalmic fit characteristics for a user wearing a selected fitting frame 500. In some implementations, the systems and methods may provide for the collection of measurements to determine both display fit characteristics and ophthalmic fit characteristics. As described above with respect to FIGS. 2A-2D, ophthalmic measurements may be detected within image data captured by the camera 360 of the computing device 300 operated by the user. These measurements, including, for example, pupil height, interpupillary distance, monocular pupil distance, pantoscopic angle, vertex distance, and other such parameters, or measures, may be detected within the image data and processed for the incorporation of corrective, or prescription lenses into the head mounted wearable computing device 100. In some examples, these ophthalmic measurements are used in coordination with the display fit measurements described above to provide both a proper display fit for a particular user, together with the corrective/prescription lens needs of the user.

Figure 7C:
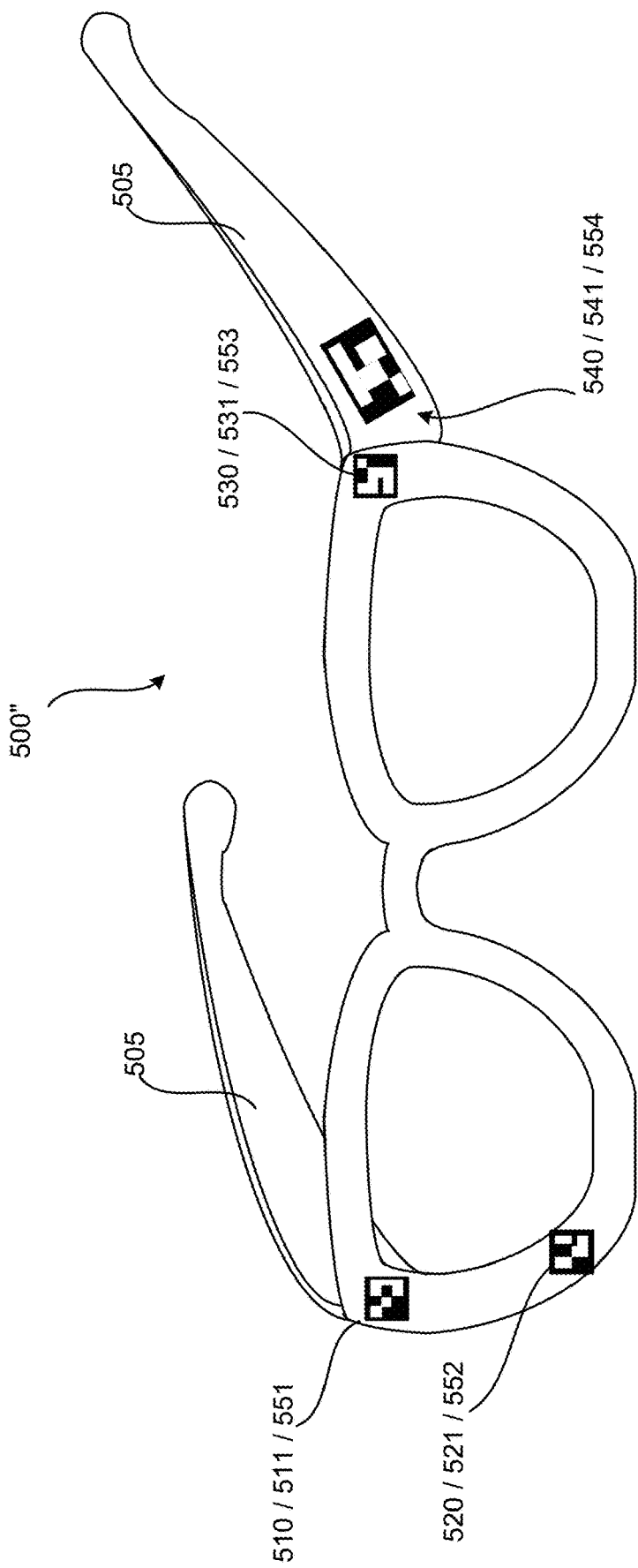

Systems and methods described above use marker positioning, geometry, pattern identification and the like to determine the three-dimensional pose of the fitting frame 500, and in turn the associated pantoscopic angle associated with the fitting frame 500 as worn by a particular user. In some examples, a fitting frame 500" as shown in FIG. 7C may include a fourth marker 540 including a fourth pattern 541 at a fourth location 554 on the fitting frame 500". The fourth marker 540 may be provided on one or both temple arm portions 505 of the fitting frame 500". When using the fitting frame 500" shown in FIG. 7C, image(s) captured from one or both sides of the head of the user may provide alternative or additional image capture data for determining pantoscopic angle.

In the example arrangements shown in FIGS. 5A-6B and 7A-7C, the markers 510, 520, 530, 540, 560 are visual markers provided on, or applied to a surface of the fitting frame 500, including a two-dimensional pattern, or matrix barcode pattern that can be detected in image based capture data and recognized based on the respective pattern, simply for purposes of discussion and illustration. In some implementations, the visual markers may be provided at other locations on the fitting frames 500. In some implementations, the visual markers may take other forms. For example, in some implementations, a coating or layer may be applied to the markers and accompanying patterns, so that the markers and accompanying patterns are not visible to the user, but are detectable by the camera 360. For example, the visual markers may include a retroreflective material that is visible to the camera 360 in response to illumination provided by an illuminator of the camera 360. In some implementations, the visual markers and accompanying patterns may include lights, and lighting patterns that are not visible to the user, but are detectable by light sensors of the camera 360. In some implementations, the visual markers detected in the image captured by the camera 360 may include detectable features of the fitting frames 500 such as, for example a shape and/or a contour of the rim portions 503, a connection point between the rim portions 103 and the temple arm portions 105, a position and/or a configuration of the bridge portion, and other such detectable features.

Figure 8:
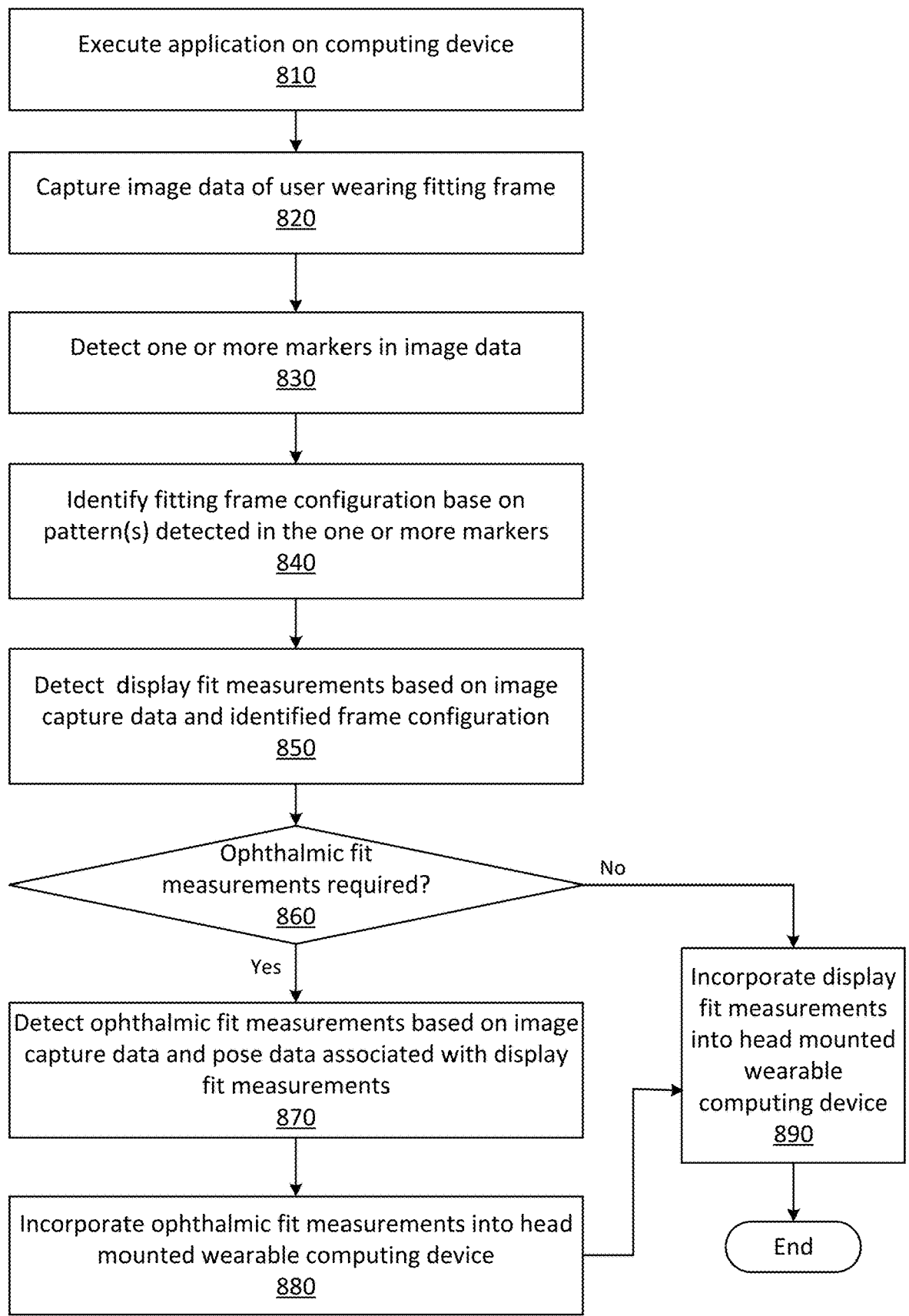
FIG. 8 is a flowchart of an example method, in accordance with implementations described herein.

FIG. 8 is a flowchart of an example method of operating a computing system to detect display fit measurements and/or ophthalmic fit measurements for a head mounted wearable computing device including a display. A user operating a computing device (such as, for example, the computing device 300 described above) may cause the computing device to execute an application that provides for detection of display fit measurements and/or ophthalmic fit measurements from image capture data (block 810). A camera (such as, for example, the camera 360 of the computing device 300 described above) is operated to capture image data of a user wearing one of a plurality of fitting frames available to the user (such as, one of the fitting frames 500 described above) (block 820). The system may detect one or more visual markers provided on the frame (such as, for example, the markers 510, 520, 530 described above) in the image data captured by the camera (block 830). The system may detect a pattern in at least one of the detect markers that identifies configuration information associated with the fitting frame (block 840).

In some examples, analysis of the image capture data for detection of the visual markers and for detection and identification of patterns in the visual markers, may be performed by the computing device, for example, the object recognition module and/or the pattern recognition module of the processor 350 of the computing device described above. In some examples, the detection of visual markers and recognition of patterns for identification of the configuration information associated with the fitting frame may be performed by an external device, such as, for example, an object recognition module and/or a pattern recognition module of the server included in the external resources 302 in communication with the computing device 300 as described above.

Display fit measurements including three dimensional pose data related to the fitting frame may be determined based on the positions of the identified markers relative to the known configuration of the fitting frame (block 850). Ophthalmic fit measurements, if required (block 860), may be detected from the image based capture data, and from display fit measurements, for a user requiring corrective/prescription lenses to be incorporated into the head mounted wearable computing device (blocks 870, 880 and 890). In some examples, the analysis for determining the display fit measurements and/or the ophthalmic fit measurements may be performed by the computing device, such as, for example, the configuration identification module of the processor 350 of the computing device 300 described above. In some examples, the analysis for determining the display fit measurements and/or the ophthalmic fit measurements may be performed by an external computing device, such as a configuration identification module of the server included in the external resources 302 in communication with the computing device 300 described above. The ophthalmic fit measurements and the display fit measurements may be incorporated into the head mounted wearable computing device for the user, to provide a viewing experience that is tailored for the optical needs of the user.

Figure 9:
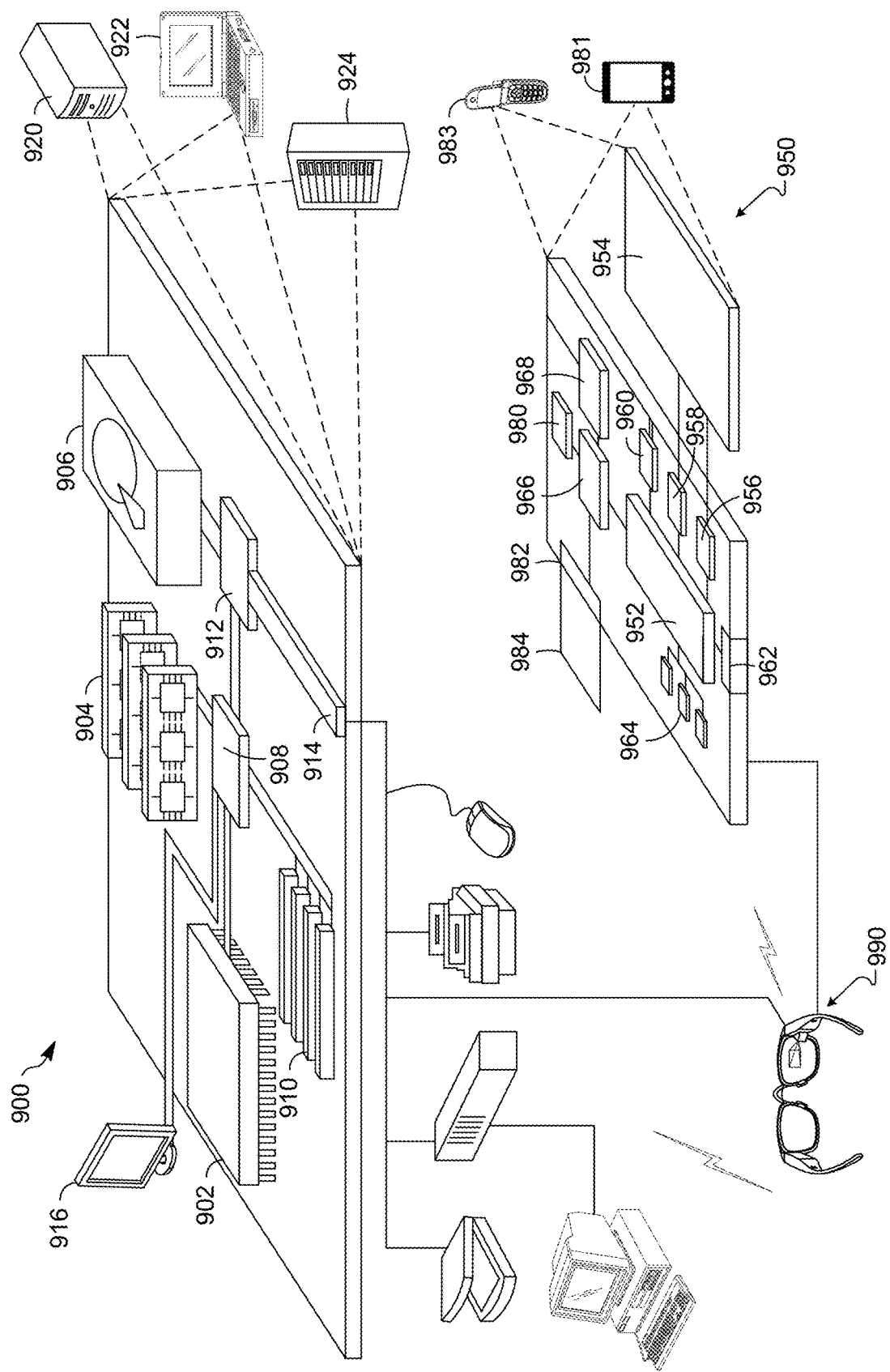
FIG. 9 illustrates example computing devices of the computing systems discussed herein.

FIG. 9 shows an example of a computing device 900 and a mobile computer device 950, which may be used with the techniques described here. Computing device 900 is intended to represent various forms of digital computers, such as laptops, desktops, tablets, workstations, personal digital assistants, smart devices, appliances, electronic sensor-based devices, televisions, servers, blade servers, mainframes, and other appropriate computing devices. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. The processor 902 can be a semiconductor-based processor. The memory 904 can be a semiconductor-based memory. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk. In general, the computer-readable medium may be a non-transitory computer-readable medium.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods and/or computer-implemented methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may be provided as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, low power Bluetooth, Wi-Fi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 983. It may also be implemented as part of a smart phone 981, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as modules, programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor, or LED (light emitting diode)) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some embodiments, the computing devices depicted in FIG. 9 can include sensors that interface with an AR/VR headset (AR glasses/eyeglasses/VR headset/AR headset/HMD device 990). For example, one or more sensors included on computing device 950 or other computing device depicted in FIG. 9, can provide input to AR/VR headset 990 or in general, provide input to an AR/VR space. The sensors can include, but are not limited to, a touchscreen, accelerometers, gyroscopes, pressure sensors, biometric sensors, temperature sensors, humidity sensors, and ambient light sensors. Computing device 950 can use the sensors to determine an absolute position and/or a detected rotation of the computing device in the AR/VR space that can then be used as input to the AR/VR space. For example, computing device 950 may be incorporated into the AR/VR space as a virtual object, such as a controller, a laser pointer, a keyboard, a weapon, etc. Positioning of the computing device/virtual object by the user when incorporated into the AR/VR space can allow the user to position the computing device to view the virtual object in certain manners in the AR/VR space.

In some embodiments, one or more input devices included on, or connected to, the computing device 950 can be used as input to the AR/VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 950 when the computing device is incorporated into the AR/VR space can cause a particular action to occur in the AR/VR space.

In some embodiments, one or more output devices included on the computing device 950 can provide output and/or feedback to a user of the AR/VR headset 990 in the AR/VR space. The output and feedback can be visual, tactical, or audio. The output and/or feedback can include, but is not limited to, rendering the AR/VR space or the virtual environment, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some embodiments, computing device 950 can be placed within AR/VR headset 990 to create an AR/VR system. AR/VR headset 990 can include one or more positioning elements that allow for the placement of computing device 950, such as smart phone 981, in the appropriate position within AR/VR headset 990. In such embodiments, the display of smart phone 981 can render stereoscopic images representing the AR/VR space or virtual environment.

In some embodiments, the computing device 950 may appear as another object in a computer-generated, 3D environment. Interactions by the user with the computing device 950 (e.g., rotating, shaking, touching a touchscreen, swiping a finger across a touch screen) can be interpreted as interactions with the object in the AR/VR space. As just one example, computing device can be a laser pointer. In such an example, computing device 950 appears as a virtual laser pointer in the computer-generated, 3D environment. As the user manipulates computing device 950, the user in the AR/VR space sees movement of the laser pointer. The user receives feedback from interactions with the computing device 950 in the AR/VR environment on the computing device 950 or on the AR/VR headset 990.

In some embodiments, a computing device 950 may include a touchscreen. For example, a user can interact with the touchscreen in a particular manner that can mimic what happens on the touchscreen with what happens in the AR/VR space. For example, a user may use a pinching-type motion to zoom content displayed on the touchscreen. This pinching-type motion on the touchscreen can cause information provided in the AR/VR space to be zoomed. In another example, the computing device may be rendered as a virtual book in a computer-generated, 3D environment. In the AR/VR space, the pages of the book can be displayed in the AR/VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some embodiments, one or more input devices in addition to the computing device (e.g., a mouse, a keyboard) can be rendered in a computer-generated, 3D environment. The rendered input devices (e.g., the rendered mouse, the rendered keyboard) can be used as rendered in the AR/VR space to control objects in the AR/VR space.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user is provided with controls allowing the user to make an election as to both if and when systems, programs, devices, networks, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that user information is removed. For example, a user's identity may be treated so that no user information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The computer system (e.g., computing device) may be configured to wirelessly communicate with a network server over a network via a communication link established with the network server using any known wireless communications technologies and protocols including radio frequency (RF), microwave frequency (MWF), and/or infrared frequency (IRF) wireless communications technologies and protocols adapted for communication over the network.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a standalone program or as a module, component, subroutine, or other unit suitable for use in a computing environment. A computer program may be deployed to be processed on one computer or on multiple computers at one site or distributed across multiple sites and interconnected by a communication network.

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 70 degrees or at other orientations) and the spatially relative descriptors used herein may be interpreted accordingly.

Example embodiments of the concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A computer-implemented method, comprising:
    detecting, by an application executing on a computing device, at least one visual marker on a frame, from an image of the frame worn by a user captured by the computing device;
    detecting, by the application, a pattern included in the at least one visual marker on the frame detected in the image;
    identifying the frame and accessing configuration information associated with the frame based on the pattern detected in the at least one visual marker on the frame;
    determining a three-dimensional pose of the frame as worn by the user based on the detecting of the at least one visual marker, the detecting of the pattern, and the configuration information associated with the frame identified based on the pattern detected in the at least one visual marker; and
    determining a configuration of a display device of a wearable computing device based on the three-dimensional pose of the frame as worn by the user captured in the image.

2. The computer-implemented method of claim 1, wherein detecting the at least one visual marker includes detecting a plurality of visual markers on the frame in the image, including:
    detecting a first visual marker including a first pattern on a first rim portion of the frame;
    detecting a second visual marker including a second pattern on the first rim portion of the frame; and
    detecting a third visual marker including a third pattern on a second rim portion of the frame.

3. The computer-implemented method of claim 2, wherein the second visual marker is different from the first visual marker, and the third visual marker is different from the first visual marker and different from the second visual marker.

4. The computer-implemented method of claim 3, wherein determining the three-dimensional pose of the frame includes:
    performing a first comparison, including comparing a known position and orientation of the first visual marker and the first pattern to a position and orientation of the first visual marker and the first pattern detected in the image; and
    determining the three-dimensional pose of the frame relative to an image sensor of the computing device based on the first comparison.

5. The computer-implemented method of claim 4, wherein determining the three-dimensional pose of the frame also includes:
    performing a second comparison, including comparing a known position and orientation of the second visual marker and the second pattern to a position and orientation of the second visual marker and the second pattern detected in the image;
    performing a third comparison, including comparing a known position and orientation of the third visual marker and the third pattern to a position and orientation of the third visual marker and the third pattern detected in the image; and
    determining the three-dimensional pose of the frame relative to the image sensor based on the first comparison, the second comparison, and the third comparison.

6. The computer-implemented method of claim 1, wherein identifying the frame and accessing configuration information associated with the frame based on the pattern detected in the at least one visual marker includes identifying at least one of a model of the frame, dimensions of the frame, physical characteristics of the frame, or placement location of the at least one visual marker detected on the frame.

7. The computer-implemented method of claim 1, further comprising:
    detecting a plurality of facial landmarks in the image; and
    determining ophthalmic fit measurements for the wearable computing device based on the plurality of facial landmarks.

8. The computer-implemented method of claim 7, wherein detecting the plurality of facial landmarks includes:
    detecting a pupil height of a user in the image including the frame worn by the user;
    detecting at least one of an interpupillary distance or a monocular pupil distance of the user in the image including the frame worn by the user; and
    determining a pantoscopic angle of the frame worn by the user based on the three-dimensional pose of the frame and the plurality of facial landmarks.

9. The computer-implemented method of claim 8, wherein determining the configuration of the display device of the wearable computing device based on the three-dimensional pose of the frame as captured in the image includes adapting the configuration of the display device of the wearable computing device to accommodate the ophthalmic fit measurements.

10. The computer-implemented method of claim 1, wherein detecting the at least one visual marker on the frame includes:
    detecting the frame in the image, the frame including:
        a first rim;
        a second rim;
        a bridge extending between a first portion of the first rim and a first portion of the second rim;

a first temple arm coupled to a second portion of the first rim; and
a second temple arm portion coupled to a second portion of the second rim; and
detecting the at least one visual marker, including:
   detecting a first visual marker included at the second portion of the first rim, the first visual marker including a first pattern;
   detecting a second visual marker included at a third portion of the first rim, the second visual marker including a second pattern that is different from the first pattern; and
   detecting a third visual marker included at the second portion of the second rim, the third visual marker including a third pattern different from the first pattern and the second pattern.

11. The computer-implemented method of claim 1, wherein detecting the pattern included in the at least one visual marker includes detecting at least one of:
   a matrix barcode affixed to the frame and configured to be visible to an image sensor of a computing device;
   a retroreflective marker configured to be selectively illuminated by an illuminator of a computing device so as to be visible to an image sensor of the computing device when illuminated by the illuminator; or
   a light source configured to output an illumination pattern so as to be selectively visible to an image sensor of a computing device.

12. A non-transitory computer-readable medium storing executable instructions that when executed by at least one processor are configured to cause the at least one processor to:
   capture an image of a frame worn by a user;
   detect at least one visual marker on the frame from the image;
   detect a pattern included in the at least one visual marker detected in the image;
   identify the frame and access configuration information associated with the frame based on the pattern detected in the at least one visual marker;
   determine a three-dimensional pose of the frame based on the at least one visual marker, the pattern detected in the at least one visual marker, and the configuration information associated with the frame; and
   determine a configuration of a display device of a wearable computing device based on the three-dimensional pose of the frame as captured in the image.

13. The non-transitory computer-readable medium of claim 12, wherein the instructions cause the at least one processor to detect a plurality of visual markers on the frame in the image, including:
   detect a first visual marker including a first pattern on a first rim portion of the frame;
   detect a second visual marker including a second pattern on the first rim portion of the frame, the second pattern being different from the first pattern; and
   detect a third visual marker including a third pattern on a second rim portion of the frame, the third pattern being different from the first pattern and the second pattern.

14. The non-transitory computer-readable medium of claim 13, wherein the instructions cause the at least one processor to determine the three-dimensional pose of the frame including:
   perform a first comparison, including comparing a known position and orientation of the first visual marker and the first pattern to a position and orientation of the first visual marker and the first pattern detected in the image; and
   determine the three-dimensional pose of the frame based on the first comparison.

15. The non-transitory computer-readable medium of claim 14, wherein the instructions cause the at least one processor to determine the three-dimensional pose of the frame, also including:
   perform a second comparison, including comparing a known position and orientation of the second visual marker and the second pattern to a position and orientation of the second visual marker and the second pattern detected in the image;
   perform a third comparison, including comparing a known position and orientation of the third visual marker and the third pattern to a position and orientation of the third visual marker and the third pattern detected in the image; and
   determine the three-dimensional pose of the frame based on the first comparison, the second comparison, and the third comparison.

16. The non-transitory computer-readable medium of claim 12, wherein the instructions cause the at least one processor to identify the frame and access the configuration information associated with the frame based on the pattern included in the at least one visual marker, including:
   identify at least one of a model of the frame, dimensions of the frame, physical characteristics of the frame, or placement location of the at least one visual marker on the frame.

17. The non-transitory computer-readable medium of claim 12, wherein the instructions also cause the at least one processor to:
   detect a plurality of facial landmarks in the image; and
   determine ophthalmic fit measurements for the wearable computing device based on the plurality of facial landmarks.

18. The non-transitory computer-readable medium of claim 17, wherein the instructions cause the at least one processor to detect the plurality of facial landmarks, including:
   detect a pupil height of a user in the image of the frame worn by the user;
   detect at least one of an interpupillary distance or a monocular pupil distance in the image of the frame worn by the user; and
   determine a pantoscopic angle of the frame worn by the user based on the three-dimensional pose of the frame and the plurality of facial landmarks detected in the image.

19. The non-transitory computer-readable medium of claim 18, wherein the instructions cause the at least one processor to adapt the configuration of the display device of the wearable computing device to accommodate the ophthalmic fit measurements.

* * * * *